United States Patent
Satyanarayanan et al.

(10) Patent No.: US 6,662,198 B2
(45) Date of Patent: Dec. 9, 2003

(54) METHOD AND SYSTEM FOR ASYNCHRONOUS TRANSMISSION, BACKUP, DISTRIBUTION OF DATA AND FILE SHARING

(75) Inventors: Mahadev Satyanarayanan, Pittsburgh, PA (US); Itamar Shtull-Trauring, New York, NY (US)

(73) Assignee: Zoteca Inc., New York, NY (US)

( * ) Notice: Subject to any disclaimer, the term of this patent is extended or adjusted under 35 U.S.C. 154(b) by 254 days.

(21) Appl. No.: 09/942,659

(22) Filed: Aug. 30, 2001

(65) Prior Publication Data

US 2003/0046260 A1 Mar. 6, 2003

(51) Int. Cl.⁷ .............................. G06F 17/30
(52) U.S. Cl. .................................... 707/204
(58) Field of Search .................. 707/10, 201, 203, 707/204; 370/359; 439/533; 455/3.05; 705/9; 709/204, 228, 248; 711/161

(56) References Cited

U.S. PATENT DOCUMENTS

| | | | |
|---|---|---|---|
| 5,239,534 A | 8/1993 | Matsumoto | 369/288 |
| 5,410,697 A | 4/1995 | Baird et al. | 711/152 |
| 5,678,042 A | 10/1997 | Pisello et al. | 714/47 |
| 5,771,374 A | 6/1998 | Burshtein et al. | 713/502 |
| 5,778,395 A * | 7/1998 | Whiting et al. | 707/204 |
| 5,794,254 A | 8/1998 | McClain | 707/204 |
| 5,835,953 A | 11/1998 | Ohran | 711/162 |
| 6,023,710 A | 2/2000 | Steiner et al. | 707/204 |
| 6,101,585 A | 8/2000 | Brown et al. | 711/162 |
| 6,119,151 A | 9/2000 | Cantrell et al. | 709/216 |
| 6,131,148 A | 10/2000 | West et al. | 711/162 |
| 6,151,606 A * | 11/2000 | Mendez | 707/201 |
| 6,161,146 A | 12/2000 | Kley et al. | 709/248 |
| 6,173,399 B1 | 1/2001 | Gilbrech | 713/153 |
| 6,175,917 B1 | 1/2001 | Arrow et al. | 713/1 |
| 6,178,505 B1 | 1/2001 | Schneider et al. | 713/168 |
| 6,199,074 B1 | 3/2001 | Kern et al. | 707/204 |
| 6,202,136 B1 | 3/2001 | Wikle et al. | 711/162 |
| 6,295,541 B1 * | 9/2001 | Bodnar et al. | 707/203 |
| 6,397,307 B2 * | 5/2002 | Ohran | 711/161 |

* cited by examiner

*Primary Examiner*—Charles Rones
*Assistant Examiner*—Apu M Mofiz
(74) *Attorney, Agent, or Firm*—Jonathan B. Schafrann

(57) ABSTRACT

A system and method is provided for asynchronously sharing, backing up, and distributing data based on immutable entries. The system which is layered upon an existing operating system automatically stores, queues and distributes requested data among users.

3 Claims, 20 Drawing Sheets

METHOD AND SYSTEM FOR ASYNCHRONOUS TRANSMISSION, BACKUP, DISTRIBUTION OF DATA AND FILE SHARING

FIELD OF THE INVENTION

The instant invention generally relates to systems for file sharing, backing up and distributing data and more specifically to a method and system for asynchronous transmission, backup, distribution of data and file sharing.

BACKGROUND AND SUMMARY OF THE INVENTION

From the inception of the introduction of personal computers in the workplace, a significant problem relates to sharing, preserving by backing-up, and distributing data between multiple users. This problem becomes even more difficult when the users are scattered over the country and reside in autonomous organizations. For example, if a company wishes to work on single project with another company, an individual, a group of individuals or various combinations of entities the question of how to selectively grant access and distribute data arises. How do you insure that only data necessary for the project is distributed? How do you prevent unauthorized access to files or data which must remain segregated? And how do you simply keep track of exactly what stage the document is in?

One methodology includes the use of a local area network (commonly known as a LAN) or a wide area network (WAN) together with one or more fileservers, said file server being at least one centralized computer where the data is stored. Fileserver systems include NFS, Novell Netware, Microsoft's SMB, AFS, and other systems. These systems function well when employed by a single large user, such as a company, to allow its employees to access files and other data. A recognized shortcoming attendant to LAN systems is that they preclude third party usage by preventing access to an organizations internal network. The distribution of data is somewhat secure, but often members of the same organization can access data without proper need authorization or clearance. It should be noted that a LAN interconnects computers within a limited geographical area and LAN systems are susceptible to unacknowledged viruses. Notwithstanding, the fact that the employee is authorized, each person with LAN access has, as of right, access to all the files on the server. The files stored on a fileserver can be changed, deleted, modified, or updated. Of more importance, a "crash" of the central server, militates to a loss of data and failure, even with daily backup procedures, since the data may have been changed in between the time of the last backup and the crash. Additionally, the users will not be able to access the data while the data is being restored from a traditional backup device, and immediate access to older versions of files is not possible. Another method utilizes a wide area network (WAN). WAN systems allow third parties to receive distributed data by a distributed network. WAN systems are cumbersome, expensive and do not address the "need to know" aspects of transmitting, storing, distributing and backing up data.

Distributed file systems arise from the communication between a file server and interconnected computers which enable users to share data. It is preferred that the system should include a number of replicated central file servers to distribute the data. One such system is the Andrew File System (AFS), distributed by Transarc Corporation. AFS is a network of computers where there is a hierarchy of client machines and server machines. A user is granted access to the server machine either with or without the power to change data. Distributed file servers solve some of the issues of data reliability, but still do not provide access to older versions of data except in a limited way. For example, distributed file servers may provide snapshots every hour from the past day only.

The Internet has made file and data sharing an everyday occurrence, whether it is within an organization or with third parties. The best known mode is e-mail (electronic mail), which allows the user to send files and data, via the Internet, to others by sending same to a URL and user name. E-mail transmission occurs over what may be termed a public network. The vagaries and frailties of Internet transmission of data are legion. They include omission of attachments, transmission to unintended parties, and the unauthorized access to confidential data.

Well known in the art is the use of firewalls and encryption. A firewall is merely a software/hardware gateway utilizing an access filter, which is installed where a network is connected to the Internet. By checking all requests against acceptable access criteria the software either allows or denies access to the server where the files and data are stored. Identifying information like a token, user's machine identification, and the Internet Packet at the firewall results in access or denial. The frailties of this system are well known, since anyone who can intercept access information can enter the system. Conversely, often users who have valid access are denied by corrupted information or software incompatibility.

One method allowing third parties access to internal fileservers is the virtual private network (commonly known as a VPN). A VPN allows one or more third party users to penetrate the firewall and gain access to the distributor's server. The VPN moderates data communications between members of a defined VPN group, and allows access to the file server on the internal organization network. While data reception may require various passwords, encryption/decryption techniques, authentication, each group of users must have a set series of rules therefore. In order to utilize a VPN a user must be connected to the Internet, for example by dialing into an Internet Service Provider (commonly known as an ISP) and maintain at least a temporary membership via a name and password (See U.S. Pat. No. 6,055, 575 issued to Paulsen et al).

VPNs by their very nature suffer from a series of vagaries. First, the user must be connected to the Internet in order to access the data. If the connection fails on either side—the users or the organization's—the user will not be able to access the data. Second, after access is granted through the firewall, the user has potential access to all of the internal network. Therefore, the proprietor must insure that all of its servers do not respond to requests from outside computers and that users with limited access cannot access, delete, or modify requested data or files. By using a modality which labels and reads Internet Packet level information relating to the address and destination of information identifies the user so that clearance or rejection may take place. This method is complex and at times does not prevent unauthorized or inadvertent access to data, since every computer on the internal network must be protected. VPNs therefore are of limited use for giving third party access to data. Similar remote access methods such as SSH and PC Anywhere have similar problems.

Other distributed file systems and file sharing systems include the following: Coda, The Cedar Filesystem, Freenet, and CVS. None of the foregoing as set out in the description below provide the same or similar utility.

PRIOR ART

U.S. Pat. No. 6,175,917. Method and Apparatus for Swapping A Computer Operating System. The '917 patent discloses an invention which utilizes a computer system with a number of different storage memories, each with an operating system program and an identifier. The identifier may be switched between storage memories so if there is a failure, one can switch to the other version. The VPN unit is utilized to maintain lookup tables for members of particular groups. When data packets are sent between members of the same VPN, the VPN unit processes the packet, makes sure it is properly encrypted and adds authentication information to it. The receiving end also makes sure the corresponding VPN is authenticated, then decrypts and decompresses the packet.

U.S. Pat. No. 6,173,399. Apparatus for Implementing Virtual Private Networks. Discloses a protocol and architecture for implementing virtual private networks for using a public network space for secure private networks. A packet of information is sent between source and destination addresses, a check is made that both are members of the same VPN group, the VPN Unit processes the data packet from the sending side to make sure it is encrypted, authenticated and optionally compressed. The receiving VPN Unit handles the process of decrypting and authenticating before sending it to it's final destination. Also, disclosed is the use by remote clients, where the VPN Unit is simulated in software which operates in conjunction with the communication software for connecting the remote client to the associated local Internet Service Provider.

U.S. Pat. No. 6,131,148. Snapshot copy of a secondary volume of a PPRC pair. The '148 invention provides a method and apparatus for setting up a Peer-to-Peer Remote Copy (PPRC) session and snapshot copying a remote secondary volume to another volume on the remote subsystem. The apparatus includes a primary storage subsystem having a primary data-storage device with at least a primary volume. A primary processing unit relays a request to perform a snapshot copy of at least a portion of the primary volume to a secondary storage subsystem. The secondary storage subsystem includes a secondary data-storage device having a secondary volume which is maintained in a duplexed state with the primary volume through the use of remote copy sessions. A secondary processing unit, responsive to the relayed request can perform an equivalent of a snapshot copy of at least a portion of the primary volume by making a snapshot copy of a corresponding portion of the secondary volume.

U.S. Pat. No. 6,119,151. System and Method for Efficient Cache Management In a Distributed File System. Discloses a system for data management in a distributed file system in which a cache manager is used independent of the file system protocol. The cache is periodically written to non-volatile storage, from which it can be restored in the case of a power or system failure. The cache manager is the trigger that determines whether to store information.

U.S. Pat. No. 6,101,585. Mechanism for incremental backup of on-line files. A backup mechanism enables incremental backup operations for on-line files of a computer system having an archive bit attribute associated with each file. The mechanism comprises an archive bit change number (ABCN) attribute that is also associated with each file and that is manipulated by a file system of the computer to reflect a correct value of the archive bit when the file is modified during a current backup operation. The ABCN attribute is incremented each time the file is modified to ensure that the file is accurately copied to secondary backup storage during a subsequent incremental backup operation. One of the methods of accomplishing this is consists of: (1) creating a snapshot file in a read-only container, and duplicating contents of the on-line file to the snapshot file, each file initially having an archive bit change number (ABCN) attribute of the same value; (2) modifying the on-line file to reflect changes by a user; (3) asserting the archive bit and incrementing the ABCN of the on-line file in response to the step of modifying (4) backing up the contents of the snapshot file with the archive bit to a backup file on a secondary storage device; (5) issuing a clear archive bit command upon completion of an incremental backup operation directed to the snapshot file; (6) comparing the ABCN attribute of the on-line file with the ABCN attribute of the backup file; (7) maintaining assertion of the archive bit in the on-line file if the ABCN attributes of an on-line file ID and a snapshot file ID do not match; and (8) clearing the archive bit in the on-line file if the ABCN attributes of the on-line file ID and the snapshot file ID match, thereby enabling an accurate incremental backup operation.

U.S. Pat. No. 6,023,710. System and method for long-term administration of archival storage. Simplifies the long-term administration of remote or archive storage by collecting multiple portions of the same files stored in different backup or archive storage sessions at different times into a single updated version of the file which may then be placed on backup or archive storage. Identifies the various backup or archive sessions containing portions of the file of interest. It then retrieves these various portions and determines which is the most current version. The most current version of all portions are then assembled and coalesced into a single updated version. The system works with remote backup, local backup or archive storage and reduces the time necessary to retrieve information from a backup.

U.S. Pat. No. 5,835,953. Backup system that takes a snapshot of the locations in a mass storage device that has been identified for updating prior to updating. A system and method for maintaining logically consistent backups using minimal data transfer is disclosed. The system utilizes more than one device, having a backup storage device and one or more primary systems capable of storing information that is to be backed up on the backup storage device. The primary systems identify changes that are going to be made to the mass storage device. The combined effected locations in the mass storage device of these identified changes are then captured in a static snapshot when the mass storage device is in a logically consistent state. Only those data blocks changed since the last backup are then transferred to backup system. The backup system can then store these changes or apply the changes to the backup storage device in order to bring the backup storage device current to a particular point in time.

U.S. Pat. No. 5,794,254. Incremental computer file backup using a two-step comparison of first two characters in the block and a signature with pre-stored character and signature sets. The system backs up computer files to a remote site via modem. Files of a user computer that are found in a common library at the remote site initially are not copied to the remote site, whereas files not in the library are copied to the remote site. Then, periodically the user computer determines which blocks have been changed, and the user computer transmits only changed blocks to the remote site. The blocks are gathered in "chunk" files, and when a chunk file reaches a predetermined size, it is transmitted to the remote site for updating the back up version of the respective file. The process then resumes identifying changed blocks. In addition to flagging the changed block for transfer, the process resynchronizes the local data file with the backed up version using a two-step comparison, first comparing the first two characters in the block with a pre-stored character set, and then, if the first comparison results in a match, comparing a digital signature of the changed block with a pre-stored signature. If either comparison results in a mismatch, the test is repeated using, as the first byte of the test block, the next byte in the sequence.

U.S. Pat. No. 5,771,354. Internet online backup system provides remote storage for customers using IDs and passwords which were interactively established when signing up for backup services. This invention makes it possible for a customer computer to connect to an online service provider computer by phone, Internet, or other method, pay a fee to said service provider, and obtain additional processing and storage resources for the customer's computer. Relevant in that it fools the computer into thinking that information is being stored locally. Offsite archival services are performed by accessing virtual disk drives. Customer files that are inactive for a specified period are automatically copied to on-line service virtual disks for offsite archiving. Many disks of varying size can exist for each customer. Virtual disks are mounted and customer files are copied to their original customer disk for restoration. Virtual disks inactive for a specified period can be copied to on-line service tape for long term offsite archival. A virtual disk can be considered an offsite archival storage area. Every customer file could be stored on virtual disk with directory structures maintained. A diskette can be provided to boot a customer computer and connect to the on-line service and boot a virtual disk copy of the customer computer system disk. An advantage virtual disks provide for offsite archival is that remote storage is accessible as if locally attached. Relevant in that it discloses the use of the Virtual disk drive.

U.S. Pat. No. 5,678,042. Network management System Having Historical Virtual Catalog Snapshots for Overview of Historical Changes to Files Distributively Stored Across Network Domain. Discloses a network management system where a domain administrating server (DAS) is coupled to a network-linking backbone of a network domain for scanning the network domain to retrieve or broadcast domain-wide information, where the DAS is capable of storing and maintaining a domain-wide virtual catalog, overseeing other domain-wide activities. In such a system the domain-wide virtual catalog contains file identifying information for plural files distributively stored in two or more file servers on the network domain. Workstations are coupled by way of the network-linking backbone to the domain administrating server for accessing the domain-wide information retrieved by the domain administrating server.

U.S. Pat. No. 5,410,697. Concurrency Management Using Version Identification of Shared Data as a Supplement to Use of Locks. Uses a token and a shared lock issued by a local lock manager and local cache manager in response to a page read request from a process to trigger storage of a new cache. When the request is processed the token issued to the process during a prior request must match the token stored in the resident copy. When this occurs all resident copies of the cache are invalidated, a new cache is written through to the backing store of the changed page and a copyback is given with a new token.

Known within the art are source code management systems such as Revision Control System (RCS) and Concurrent Versions System (CVS). They allow software developers to store a history of changes in the source code of a computer program, and in the more advanced systems to have multiple users work on different copies of the data and merge their changes together. These systems calculate the differences between the different versions and store them on the server, and are generally intended only for text based files. Also known within the art are file/data-sharing, groupware and distribution systems, such as Groove, which facilitate communication among groups of people. In accordance with the groove-type system, communication between Groove users is peer to peer (that is one third party user's computer communicates directly with another third party user's computer). The connection is in direct relation and the changes are sent directly to the other. Unless both parties are connected to a network at the same time, and there is no hindering firewall there will be no communication possible. Therefore, in order to use the groove system a relay must be interposed—(if client A wants to transmit to client B then the data must be stored temporarily on a relay (computer). Later, when B is connected to the network, it downloads the data from the relay, at which point the data is removed from the relay. In the instant invention, unlike the groove-type system, the relay is not just a temporary storage location—it's a database where the data resides permanently. In the instant invention, the database does not function merely to provide drop off point where direct communication is not possible, but instead functions as the repository for the main copy of the data. In the groove-type system the data is ephemeral, it resides on the system until the users requests the same so that when a client downloads the data from it, it is no longer existent therein. With the present invention once the user downloads the data, only a copy is transmitted and the immutable original continues to reside in the database, allowing others to download the data. As a result the user is secure in the knowledge that the data will be there in the future, so in the event of catastrophic destruction of data on the user-side the data can be retrieved from the database again. Simply, groove-net relies on a peer to peer solution unlike the present invention.

The Freenet system is yet another instance of a peer to peer system. To fashion a Freenet system one uses a large network of machines, communicating in a peer to peer fashion. Data can be inserted and requested, and is protected, by employing a key self-signing protocol. Freenet differs however in a number of fundamental points. First, the core of Freenet is a routing algorithm designed to move entries near "similar" entries, and to distribute them in such a way that popular data has more copies in the network than unpopular data. The result is a probabilistic system, where data that is inserted is not guaranteed to be retrievable by other users even if it exists somewhere in the system, depending on the location of the requestor. Less popular data, even if it is quite important, may be dropped from the system and disappear. The Freenet-type system is extremely decentralized, and requires many computers (hundreds or even thousands of computers). As a result a user who wishes to retrieve information may have to wait for a long period of time. Moreover, if the data is not accessed then it is likely it will be deleted from the system. This system is simply another peer to peer manifestation.

Email (using the SMTP protocol) although not being strictly peer to peer and being an asynchronous data sharing mechanism is quite different from the instant invention. Data is sent to a relay point, from which the recipient can retrieve it, optionally leaving it there for future use (e.g. the IMAP protocol). In email the message being sent is relayed through a series of SMTP servers until it reaches its destination, and the sender has no way of knowing if it arrived or was delayed or dropped on the way. Instead of sending the data to a database, the data is merely sent to another server to either be re-sent or downloaded, or resides on the server (IMAP). In the present invention, the data is sent straight into the database, and the sender is insured that it will be stored as an immutable entry indefinitely. Email is less generic, supporting only a chronologically-ordered listing of messages, whereas the instant invention uses a more generalized database structure allowing much more complex and sophisticated forms of interchange. The present invention is not user oriented, but uses location-based access control to create shared areas, allowing shared areas for multiple users, integration with existent access control, preventing people from spamming addresses, and automatic creation of new areas, as opposed to emails extremely limited comparable facilities.

Usenet is also known in the art. Based off of NNTP (Network News Transfer Protocol) and the Usenet message format, is a method for building newsgroups that can be accessed by networked computers. A user posts a message to a specific newsgroup (e.g. 'comp.lang.python'), and other users can then list the contents of that newsgroup and download this message. The newsgroups are organized as a hierarchy of groups. For example, the newsgroup for the programming language Python is 'comp.lang.python'. It is inside the 'comp.lang' (computer languages) section of the top-level 'comp' section (computing related newsgroups). NNTP supports user/password based authentication. The Usenet protocols and design are meant for message based discussions—postings in the newsgroups are organized by a simple ordering (posting 1, posting 2 . . . ), unlike the present system where the data can be organized into more complex structures, hierarchies and versions. In the Usenet system the headers and meta-data cannot be encrypted. The present invention, on the other hand, resides on top of a generalized database, where all data is encrypted. Unlike Usenet's hierarchal newsgroups the namespaces of the present invention are not structured in any way.

OBJECTS OF THE INVENTION

It is the principal object of the present invention to provide a system and method for distributing, backing-up and transmitting data to remote users.

Another object of the present invention is to provide a system for presenting immutable data.

An additional object of the present invention is to provide a system for sharing data where there is no single point of failure.

Yet another object of the instant invention is to provide a system whereby the user automatically receives data on an asynchronous basis.

Still another object of the instant invention is to provide a system whereby the user does not have direct access to the server and its files.

Another object is to insure that data is never lost, always accessible, easily shared, and may be accessed without a direct connection to the Internet.

Finally, a further object is to create a system for the above-stated tasks that may be layered over existing software, that works in conjunction with TCP/IP firewalls, and that can act as a backup mechanism.

SUMMARY OF THE INVENTION

Therefore, in accordance with the present invention, a system and method for the asynchronous transmission, storage, backing-up and distribution of data, imparts a proprietor (e.g. a server proprietor) with the ability to transmit data to remote users. As a general precept the data is immutable, that is a recipient does not have the power to modify, delete or change the data, said data or files residing as a snapshot thereof. The system resides as a layer above resident software and provides a method for storing, transmitting, backing up and distributing the data in the form of snapshots of existing data.

Overall there are three main parts to the system. The first part is an asynchronous data sharing part. A second part is a database preferably composed of immutable entries, while the third aspect of the system is the authentication protocol.

The data is stored and backed up at a desired interval, with the snapshot of changes derived therefrom preferably being stored as immutable entries of the data. The data as stored is internally consistent, consisting of a copy or snapshot of the original data at given intervals. Since the system generates copies or snapshots of the original data at specified time intervals either automatically or specified by the user, it provides the user with a way of sharing data and as a backup for the data. The referenced interval can be short (on the order of zero to ten minutes) as opposed to traditional backup system's one day interval, it provides a historical view of the data as it changed, and allows other users to get an up to date internally consistent snapshot or copy of the data as it is changed.

By creating data which is identical and unchangeable all parties work on the same version. Without the ability to modify or delete data, each user is secure in the knowledge that there is but one updated version, and that is version is consistent and whole. The system provides on a snapshot basis immutable files which reside both centrally and locally. Moreover, the user needs only to save the data to a dedicated folder, and the system in accordance with the instant method will distribute the data upon the user connecting to a dial up connection (Internet, network, etc.). This solves the longstanding problem of automatically backing up data, and sharing the most recent incarnation of data among multiple users.

Additionally, once the data has been downloaded, the user can browse the data even while disconnected from the network, allowing offline access to the data.

In one embodiment, a proxy-based methodology tracks and accepts changes naming the version and housing same in the database and may be stored as a version of the original. Stored in an external database, a copy of the data resides, not only on at least one node, but also on the database node or the originating machine but may be asynchronously transmitted to other users upon their request and authentication.

In order to insure that only authorized personnel receive the data, a protocol might be added which authenticates access by a user who requests data. The act of logging on to the Internet, network or dial up connection, is sufficient to effectuate receipt by the user (requester) for updated data.

The system in accordance herewith does not change, modify or alter the software upon which it is layered, but is designed to reside thereupon.

Unlike a VPN, pursuant to the instant system, there is no need for the remote or local user to establish a connection to the file server in order to store or retrieve files. Instead, the instant system and method employs a protocol whereby logging on to the Internet automatically creates a communication for exchange of data.

The system in accordance herewith does not change, modify or alter the software upon which it is layered, but is designed to reside thereupon, and all data is kept in local storage, thus obviating the requirement for user access to a primary server.

One example of the system is a form-fulfillment system, for example signing up for health services. The user fills in their data in an application, which is then stored, in an encrypted form on the local hard disc. When the user connects to the Internet or some other network, the program stores this data on a remote data-storage system.

Asynchronously, the people who this data is intended for can connect to the data-storage system and download any new forms that have been submitted.

Another example (which will be expanded later on) of the operation of the system is a file-backup system. The system in accordance herewith utilizes a data storage system which constantly stores a snapshot of the file system so that changes thereto are stored in the database on a file by file basis. If the snapshot detects the change in a file or in data that file or data will be stored as a separate entry (file/data). Therefore, a snapshot is the database comprised of at least a file defined on a user by user basis.

As stated hereinabove, unlike a VPN there is no need for a direct connection to the server, instead there is a protocol whereby logging on to the Internet creates a communication for exchange of data. This is the essence of the asynchronous aspect of the system. Unlike most systems, the instant system is not a peer to peer system contemporaneous connection is not necessary.

The system in accordance herewith will queue each snapshot, saved in accordance with the timed update, and when the user logs on to the dial up network, will upload the snapshot to the primary or database node and pursuant to the instructions promulgated therewith, will request and receive any updates relating thereto.

BRIEF DESCRIPTION OF THE DRAWINGS

It should be understood, by one skilled in the art, that the drawings depict certain embodiments of the invention and therefore are not to be considered a limitation in the scope of the instant invention, but that these and other advantages of the present invention will be more fully understood by reference to the following detailed description when read in conjunction with the attached drawings in which.

DETAILED DESCRIPTION

Figure 1:
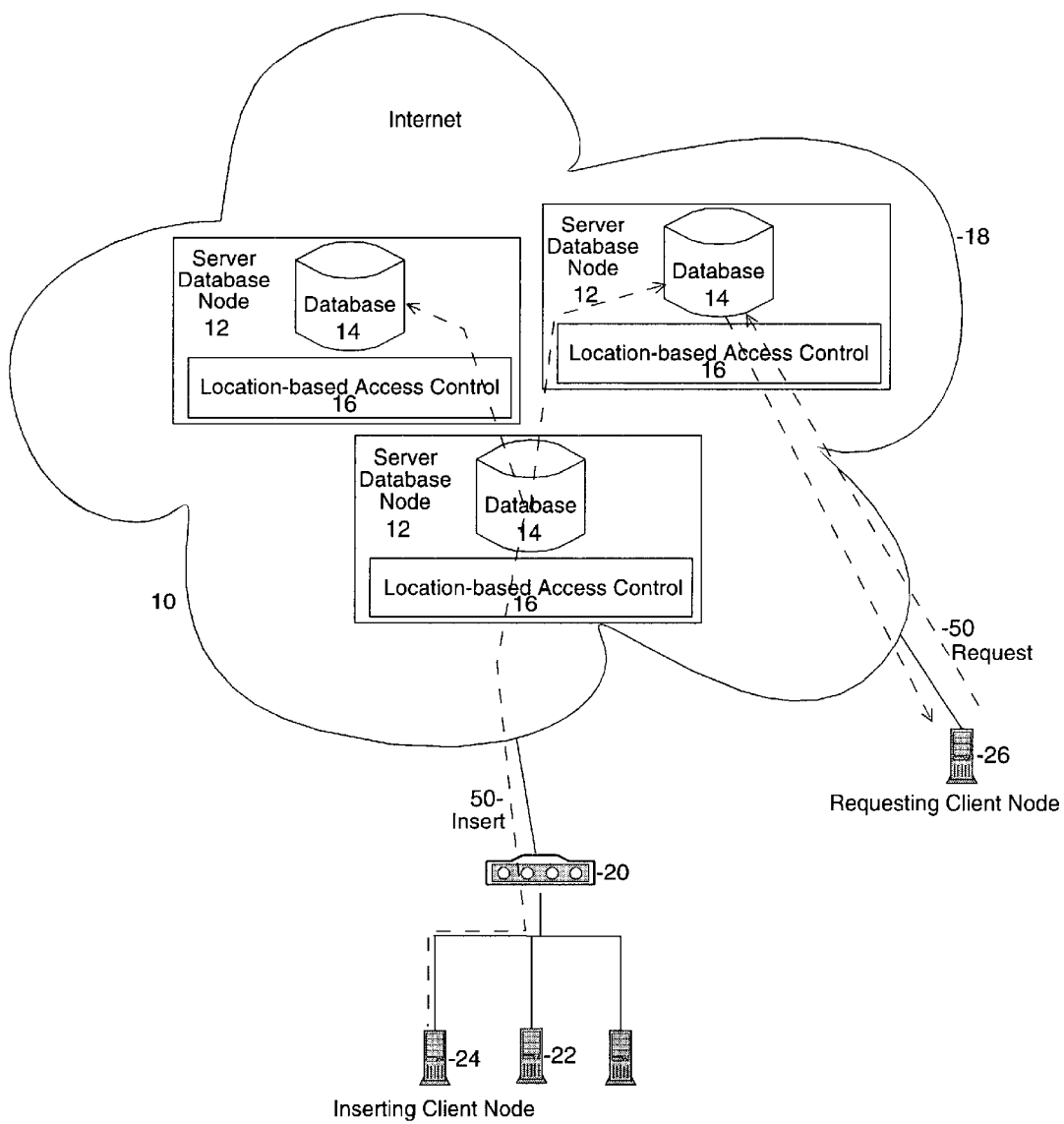
FIG. 1 is an overall system diagram for a system for asynchronous transmission, backup, distribution of data and file sharing.
Figure 12:
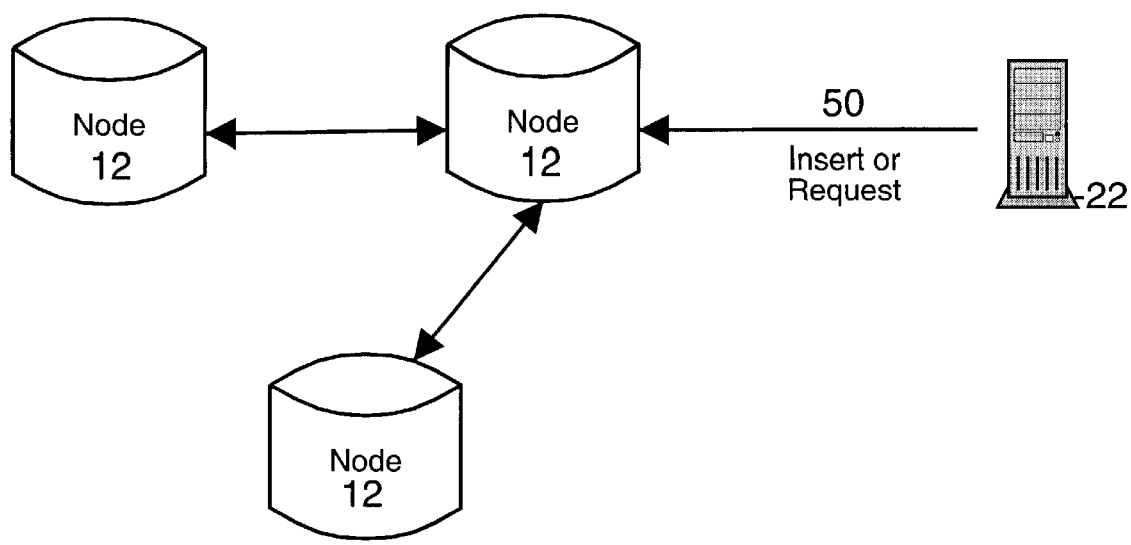
FIG. 12 is a diagram of voting for a distributed database thereof.
Figure 13:
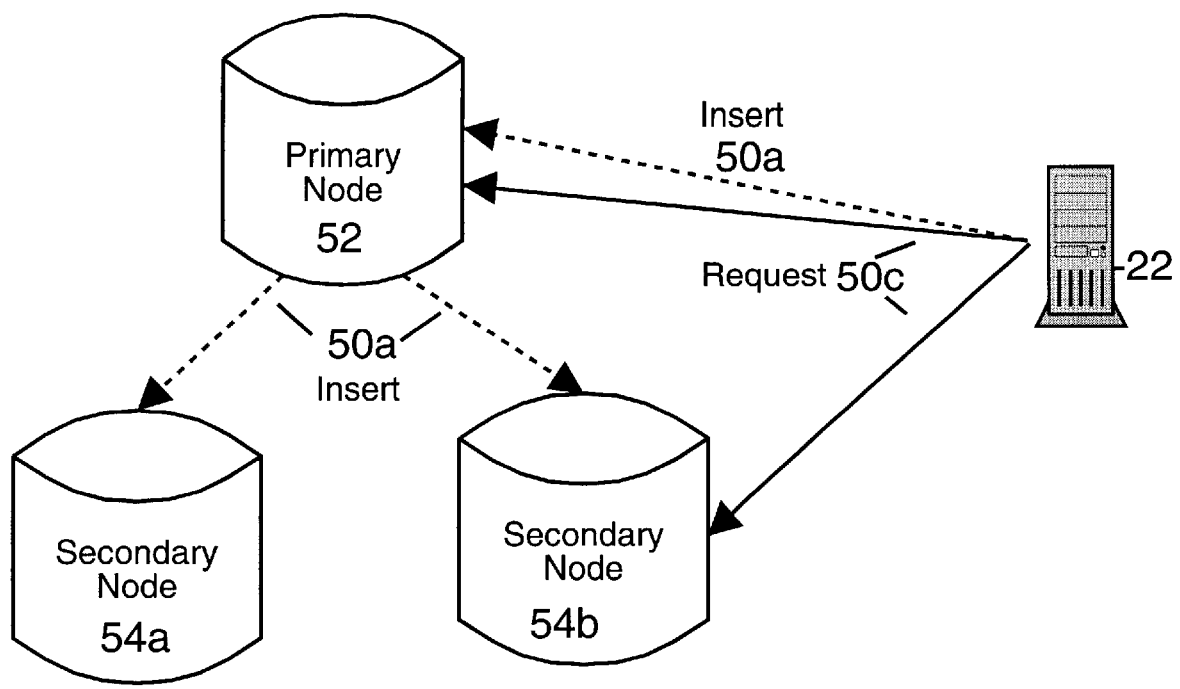
FIG. 13 is a diagram of the database setting out primary and secondary algorithm thereof.
Figure 14:
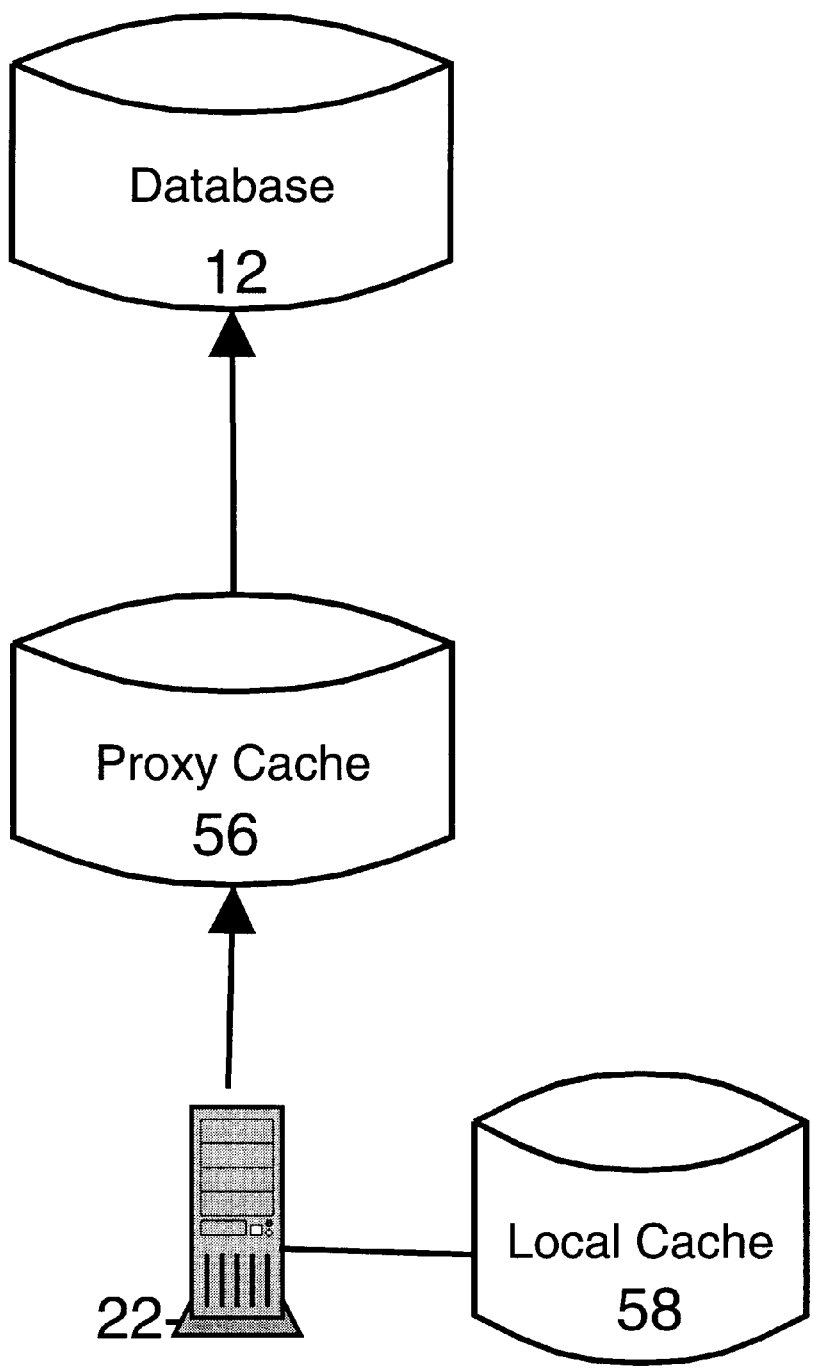
FIG. 14 is a diagram of the caching proxy thereof.
Figure 15:
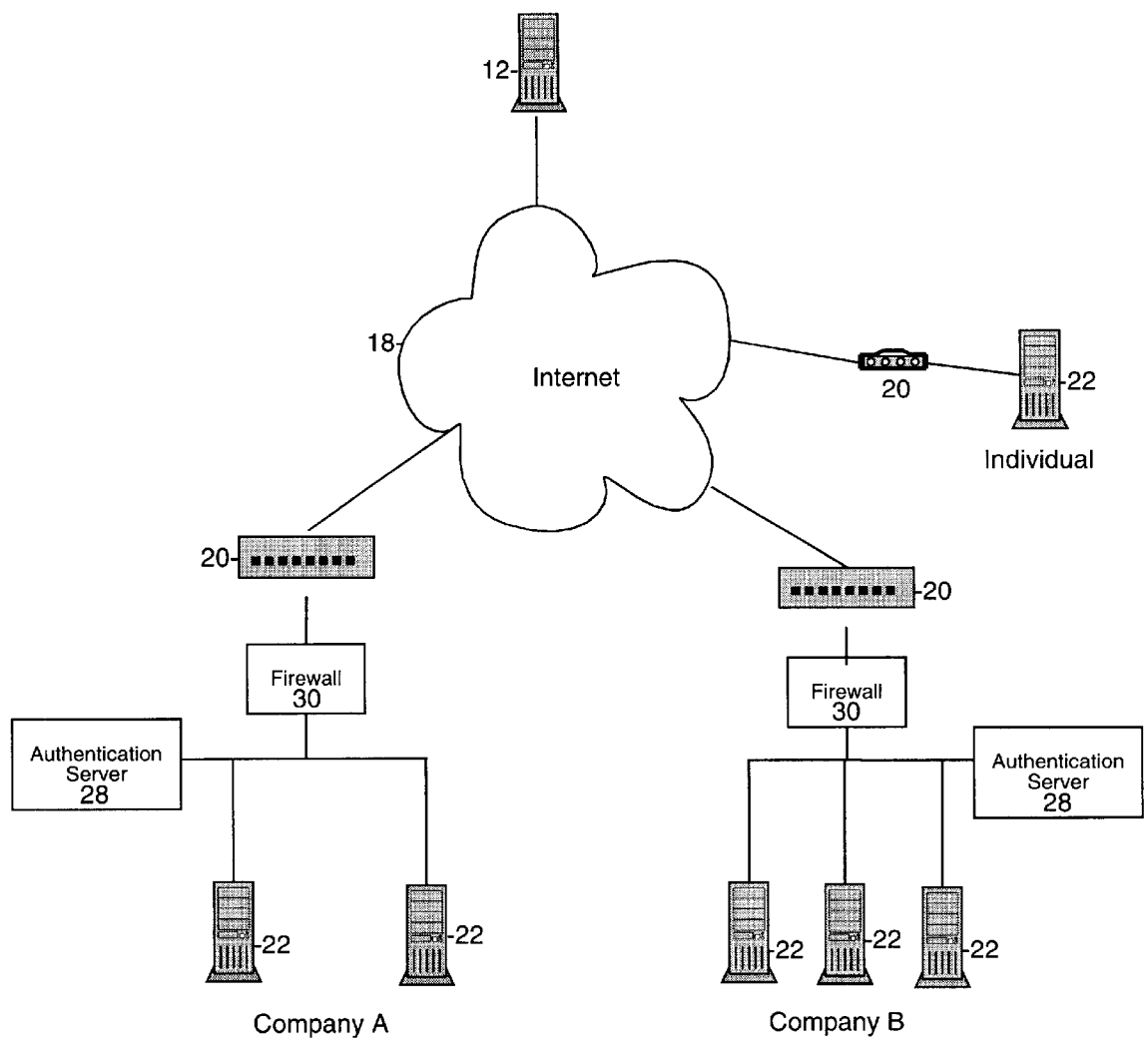
FIG. 15 is a diagram of different organizations employing authentication systems thereof.
Figure 16:
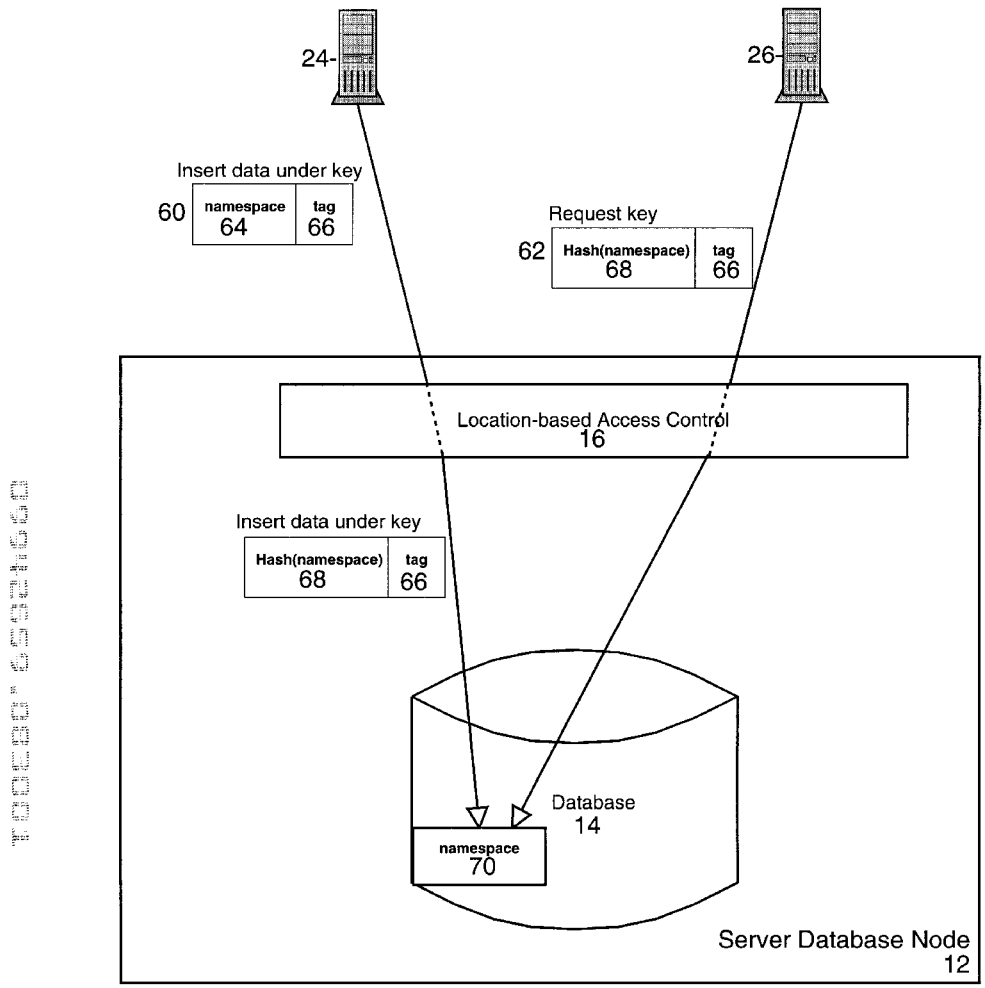
FIG. 16 is a diagram of the hash based location based access control thereof.
Figure 17:
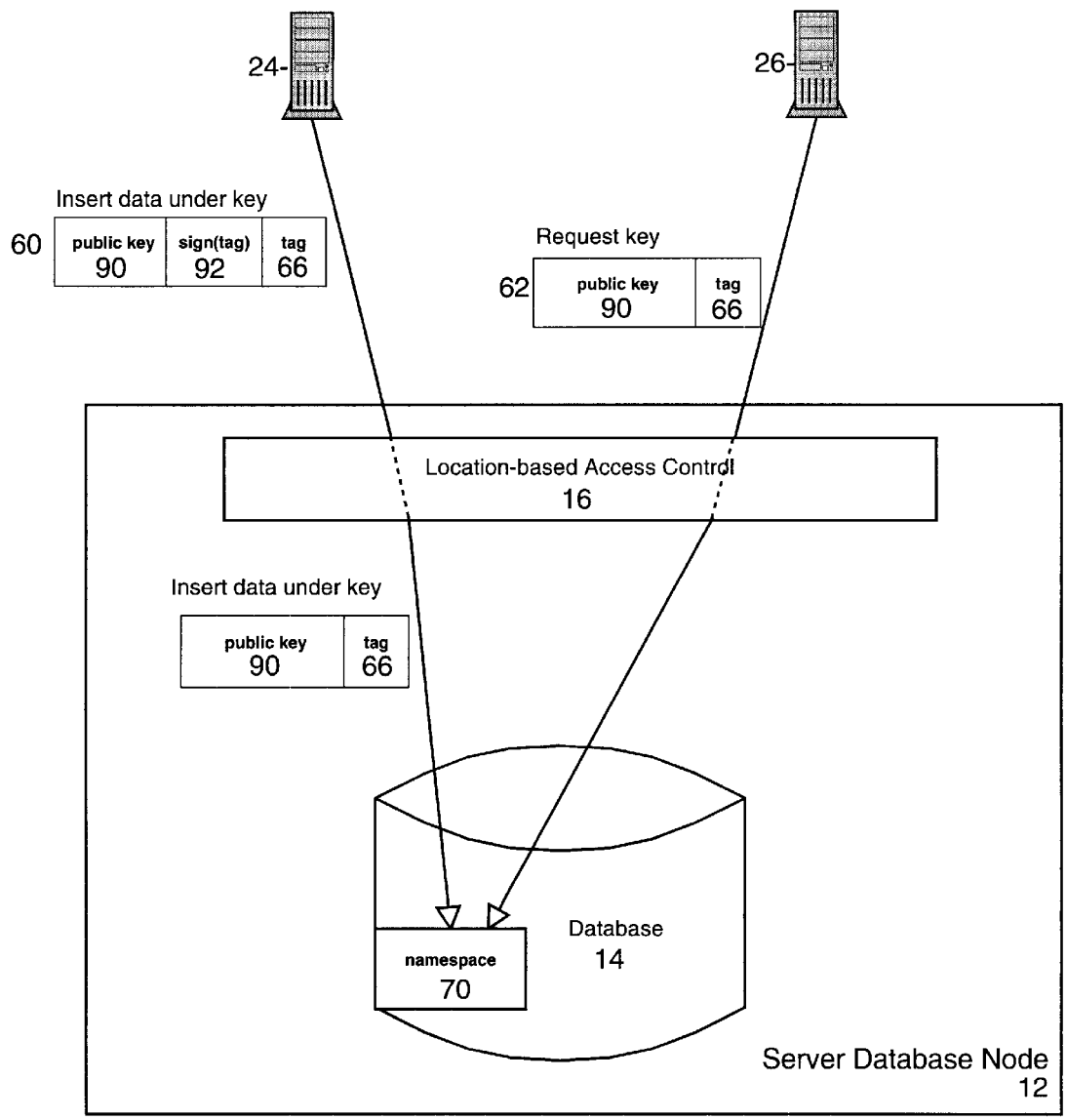
FIG. 17 is a diagram of the public key based location based access control thereof.
Figure 18:
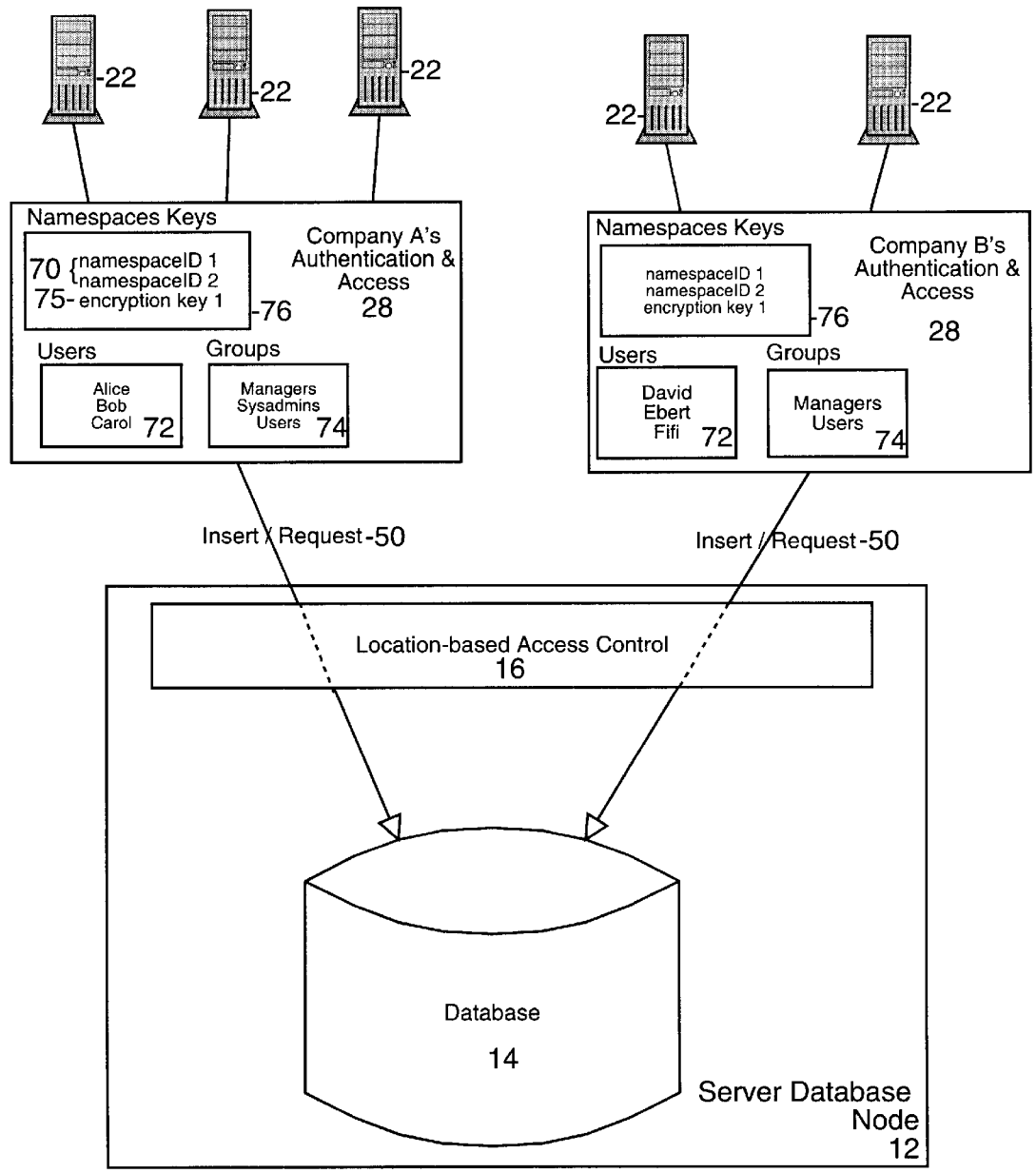
FIG. 18 is a diagram of the two level access control for system.

To wit, turning now with more specificity to the drawings, wherein like numerals depict like parts throughout, the number 10 generally depicts a system for asynchronous transmission, backup, distribution of data and file sharing and the method therefore. In addition, in FIGS. 1 and 15, dashed lines depict data flow whereas solid lines depict network connections (solid connections). In FIGS. 12 and 14, solid lines depict data flow. In FIG. 13, dashed lines depict inserts whereas solid lines depict requests. In FIGS. 16, 17 and 18, solid lines depict requests and inserts to the database whereas dashed lines depict the requests and inserts being transformed by the location-based access control. It must be noted that for purposes of the present invention, the system will be generally described in terms of one or more database nodes and one or more originating, user or requester nodes. As illustrated by FIG. 1, system 10 in accordance with the instant invention is preferably employed as a PC-based system. That is, unlike other distributed file systems, the present invention, can be operatively employed with a standard Windows-based PC to export files/data to a third party user, requestor or inserter (hereinafter user/requestor/inserter) instead of employing a dedicated server for the user/requestor/inserter to interact or communicate with System 10.

In accordance with FIG. 1, a preferred overall System 10 includes at least an Server Database Node 12 (which may also be defined interchangeably herein as a database node) and at least a secondary node or user/requestor/inserter node 22. For purposes hereof, nodes 22 may be understood as a personal computer or server as it is commonly understood in the industry including a personal data assistant including wireless apparatus. In one embodiment, as set out with specificity in FIG. 11, there may be more than one database node and it is desirable that there are several database nodes 52 and 54*a* and 54*b*. And pursuant to FIG. 2, system 10 in accordance with the instant invention, layers on top of existing software, and provides utilities for distributing, backing up, transmitting, files to one or more users who may then modify or otherwise change a copy of the file and distribute the changes in accordance therewith, but without changing the version worked upon. Therefore, whether the user is running a Windows operating system, a Unix system or another operating system, the system in accordance herewith layers on top thereof. Layering defined as being installed on an existing operating system and one or more computers. Unlike many remote systems the instant invention utilizes the original authentication system 28 of FIG. 15 and works with existing TCP/IP systems and firewalls 30 as best seen in FIGS. 4, 5 and 15.

Figure 4:
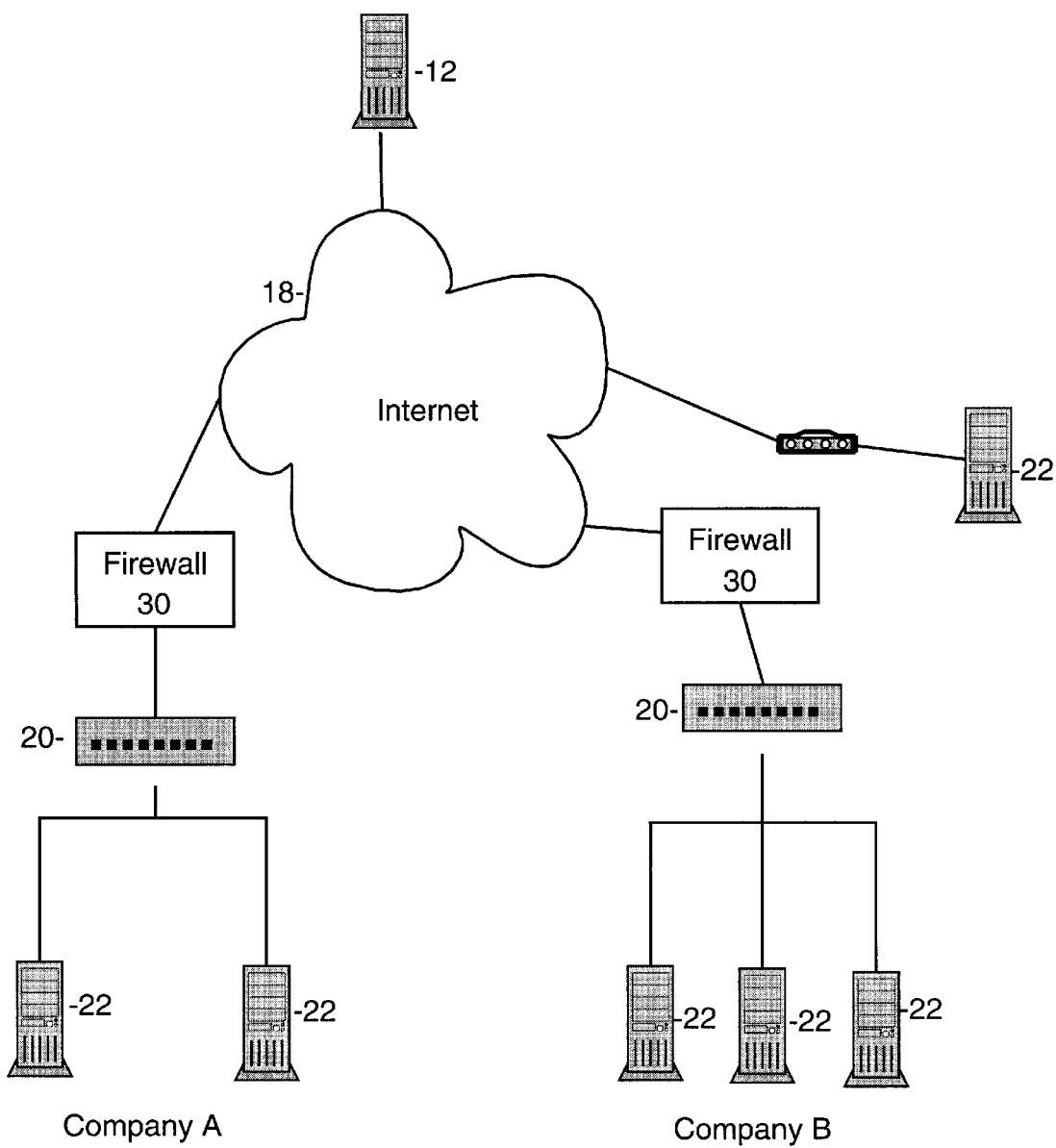
FIG. 4 is a diagram of the system thereof showing the network infrastructure.
Figure 5:
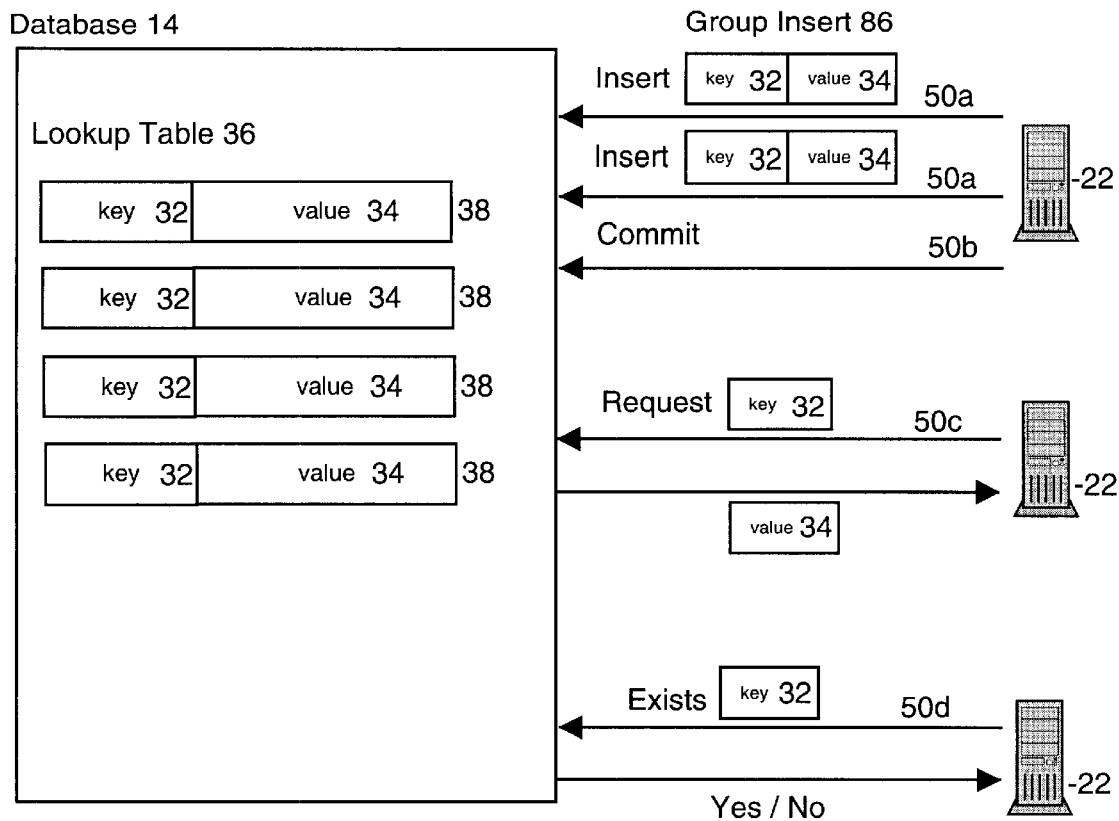
FIG. 5 is a diagram of the database interface thereof.

FIG. 4 depicts the relationship among individuals or user/requestor/inserter 22, groups of networked users/requestors/inserters 22 of Company A and Company B, the Internet 18, and a server node 12, which is accessible through the Internet 18. More specifically, the aforementioned FIG. 4, sets out the relationship between each node and the server node. For example, user/requestor/inserter 22 must store the appropriate key on his/her own personal computer, so that once connected through the dial up connection, DSL, modem or other connecting device 20 the user/requestor/inserter 22 can locate the information in server node 12.

Figure 10:
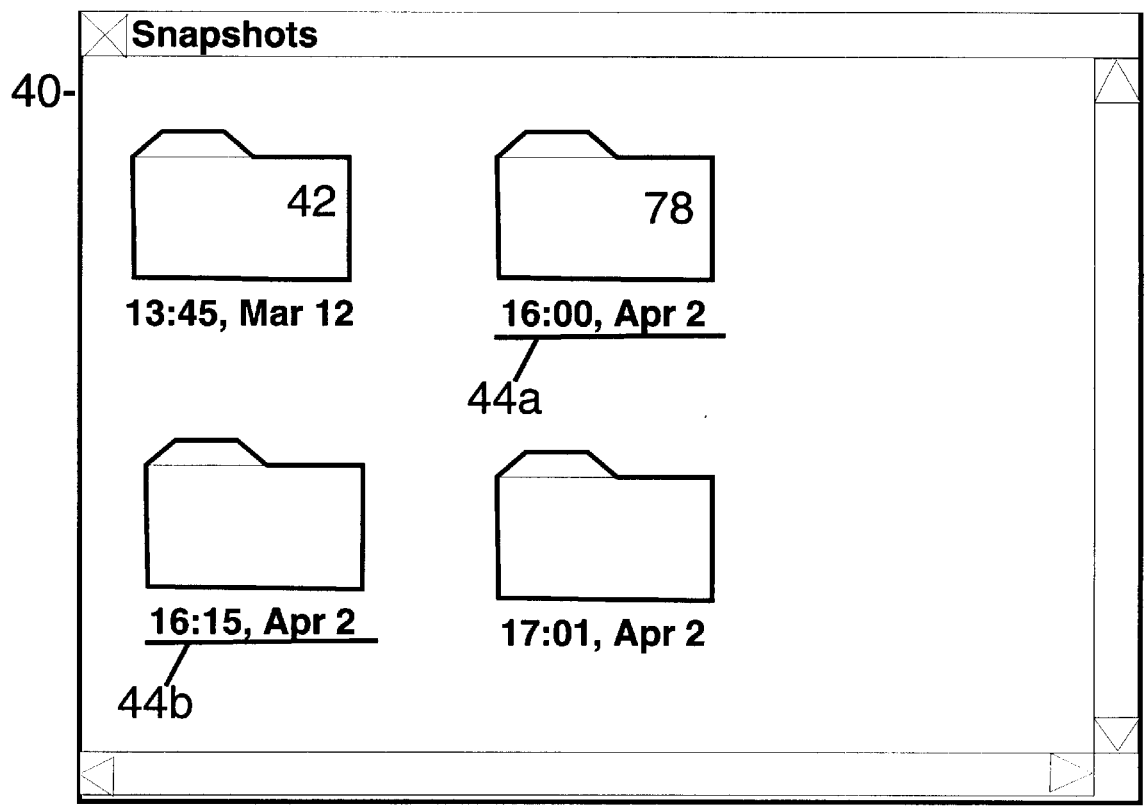
FIG. 10 is a diagram for browsing the snapshots and the interface thereof.
Figure 19:
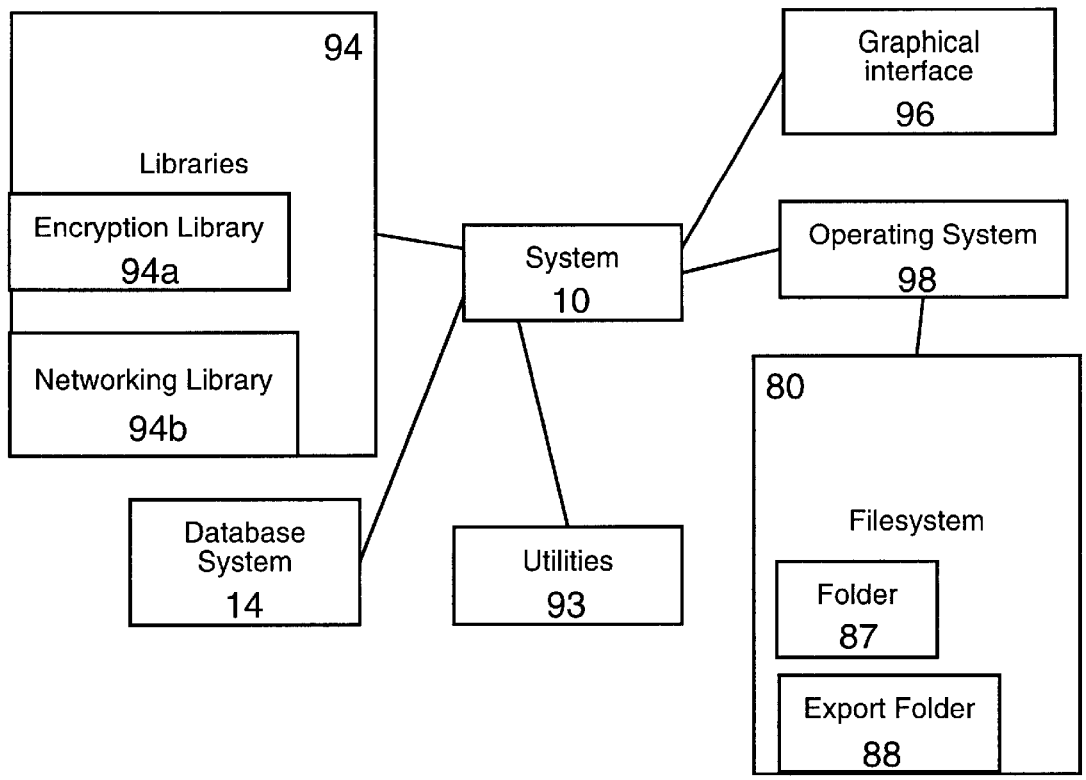
FIG. 19 is a diagram of the system layers.

As shown in FIGS. 10 and 19 a file paradigm 44*a* and 44*b* for the instant invention preferably revolves around the use of immutable data, the original of which cannot be changed. One such definition would be a read only file system. The system 10 uses a snapshot 78 of the file system 80 which is to be distributed (used by one or more users), as depicted in FIG. 1. Unlike other systems as set out in the prior art, instant system 10 in a preferred embodiment, utilizes a data structure that is a copy of the original data, and is preferably immutable, and cannot be changed (read only) and the copy of the data is inserted as a new entry (see 44*a* and 44*b* of FIG. 10). Therefore, the data is "read-only" regardless of access criteria. As a general rule and illustrated by FIG. 5, a snapshot of the complete file system identified by a specific identifier or key 32 and under that key the data is stored as a value 34 set out herein, remains resident and unchanging for an indefinite period of time. For purposes of the instant invention, the term data may include but not be limited to data, word files, images, random binary data, sound bytes, any series of bits and combinations thereof.

In common with all back-up systems, the user can define the period for system 10 to back-up and store data. Once set, system 10 will store, insert as in FIGS. 2 and 3 distribute the most recent version to all users who have access to the system and request same as in FIG. 3. Set out below and illustrated in FIGS. 2 and 3, when read in light of FIG. 1 which is inherently incorporated in this disclosure, are the methods for inserting and requesting data.

Inserting Data

Figure 2:
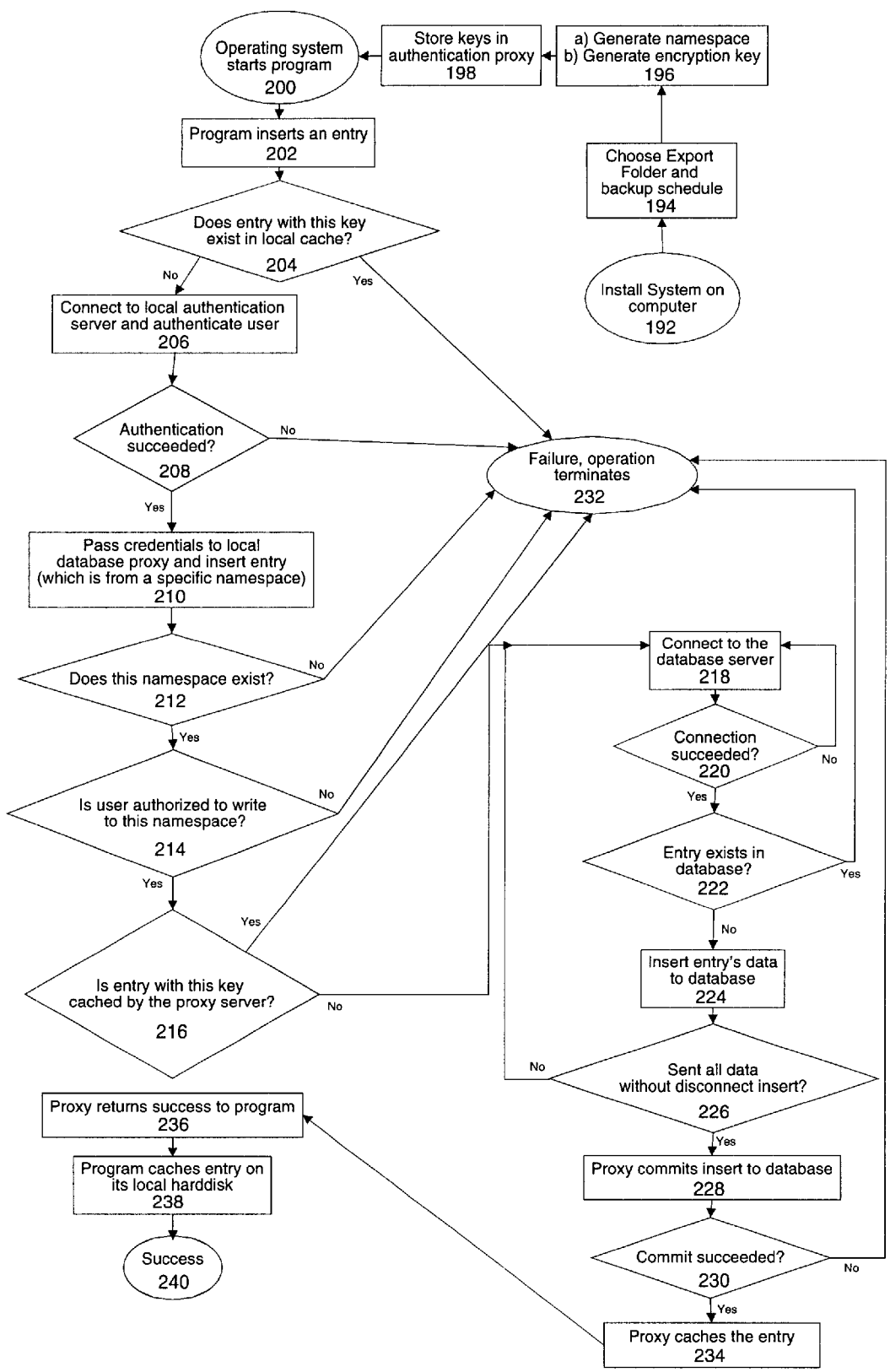
FIG. 2 is a general flow chart for inserting data in a system for asynchronous transmission, backup, distribution of data and file sharing.

Turning to FIG. 2, FIG. 16 and FIG. 19, first, system 10 must be installed 192 on the user/requestor/inserter 22 of user/inserter's (hereinafter user/inserter and user/requestor/inserter are the same node) computer. Generally, and in relation to file sharing, the user/inserter either creates a folder 87 or names an existing folder 87 and so chooses an export folder 88 from which the data will be requested and retrieved 194 from FIG. 2. Next a namespace for the data which shares the same namespace and an encryption key are generated by system 10. The namespace 70 defines a shared data which possesses the same permissions and is encrypted by the same key 75 (e.g. a newsgroup with multiple postings is an example). The information thus generated is registered with an authentication server of the user/requestor/inserter 22, and the permissions are set on the authentication server so that the server knows which users/inserters can be granted access or are denied access to the data so generated. Pursuant to a preferred embodiment the aforementioned stages are completed only once, the first time the system is set up. Thereafter the system will automatically discern access or denial automatically.

Figure 6:
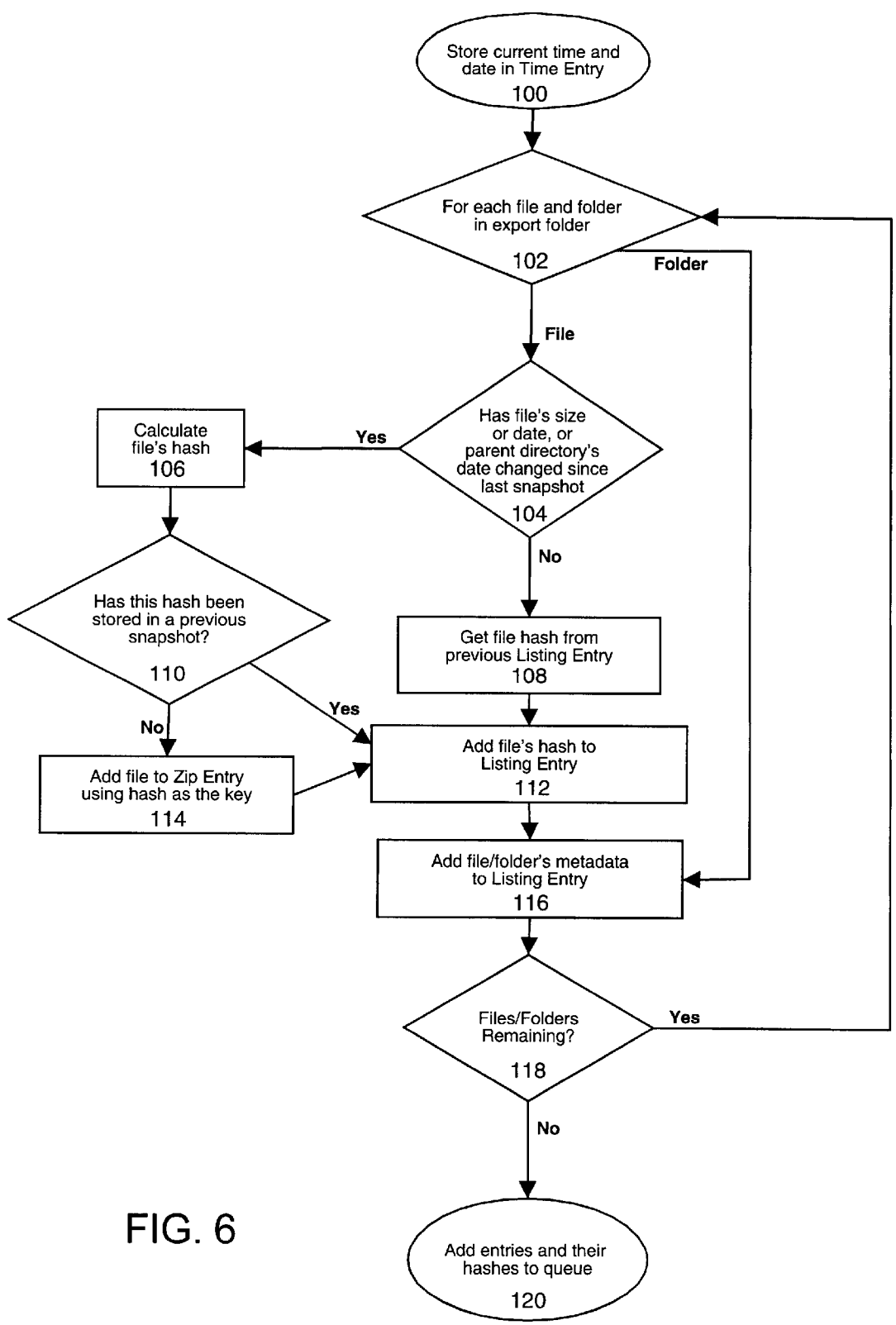
FIG. 6 flow chart showing a method thereof for creating a snapshot.

The operating system 98 initiates the program 200, and the program may be instructed to insert data into the database 202 (the data is generated with an application specific algorithm, e.g. FIG. 6 for file sharing). This data will be stored under a specific key (see FIG. 7 and the explanation which follows). In one embodiment storage under a specific key may be a series of numbers which additively increase with every insert—"1", "2", etc.

With reference to FIGS. 2 and 5 as the protocol unfolds, system 10 checks look up table 36 to ascertain if there is an entry under the referenced key 32 in the local cache 204. If such a key 32 exists, the insert will fail 232, and the protocol terminates 232. If such a key 32 does not exist, system 10 connects to its local authentication and access server 206 (e.g. a local Windows 2000 server).

If authentication proceeds without issue 208 the program continues, and with the authenticated credentials, the program directs the authentication system 28 local database proxy 210 to insert an entry under a specific namespace 70.

Referring to FIG. 2 and FIG. 18, If the namespace 70 exists 212, the proxy 210 checks the authentication system 28 to see if the user who has logged on can access only this namespace for writing 214 (a policy specified by the system's administrators in stage 198). In other words the program identifies whether the user can read, read/write, write or if denied access altogether. If authentication system 28 can write to this namespace the proxy 210 checks the lookup table 36 to ascertain whether there is an entry with this key in its cache 216. If an entry exists the insert will obviously fail 232.

With Reference to FIG. 2, FIG. 5, and FIG. 14 if the program determines that the entry does not exist 216, the proxy cache 56 connects to the originating database server 218, continuing to do so until it succeeds 220. The proxy cache 56 checks if an entry with this key exists in look up table 36 of database 12, and if it does exist, then insert will fail 232 and terminate. If no such entry exists in look up table 36, the proxy cache 56 sends the entry's data into the database 224, and if the connection is broken or there is a disconnected attempt 226, system 10 reconnects 218. The proxy cache 56 then sends a commit command 50*b* to the database 228. A commit command may be defined as the instructing of the database to execute at least a series of commands in an atomic ("all or nothing") fashion. Notwithstanding failure of this step 230, the proxy then stores the entry in the cache 234 of node proxy cache 56, returns the success of the operation to the program 236 as an insert complete and acknowledgement thereof. The program then stores the entry in its local cache 58, of database 238 and is now successfully finished 240. The process will then stand ready to insert more entries on a chronological basis.

Figure 3:
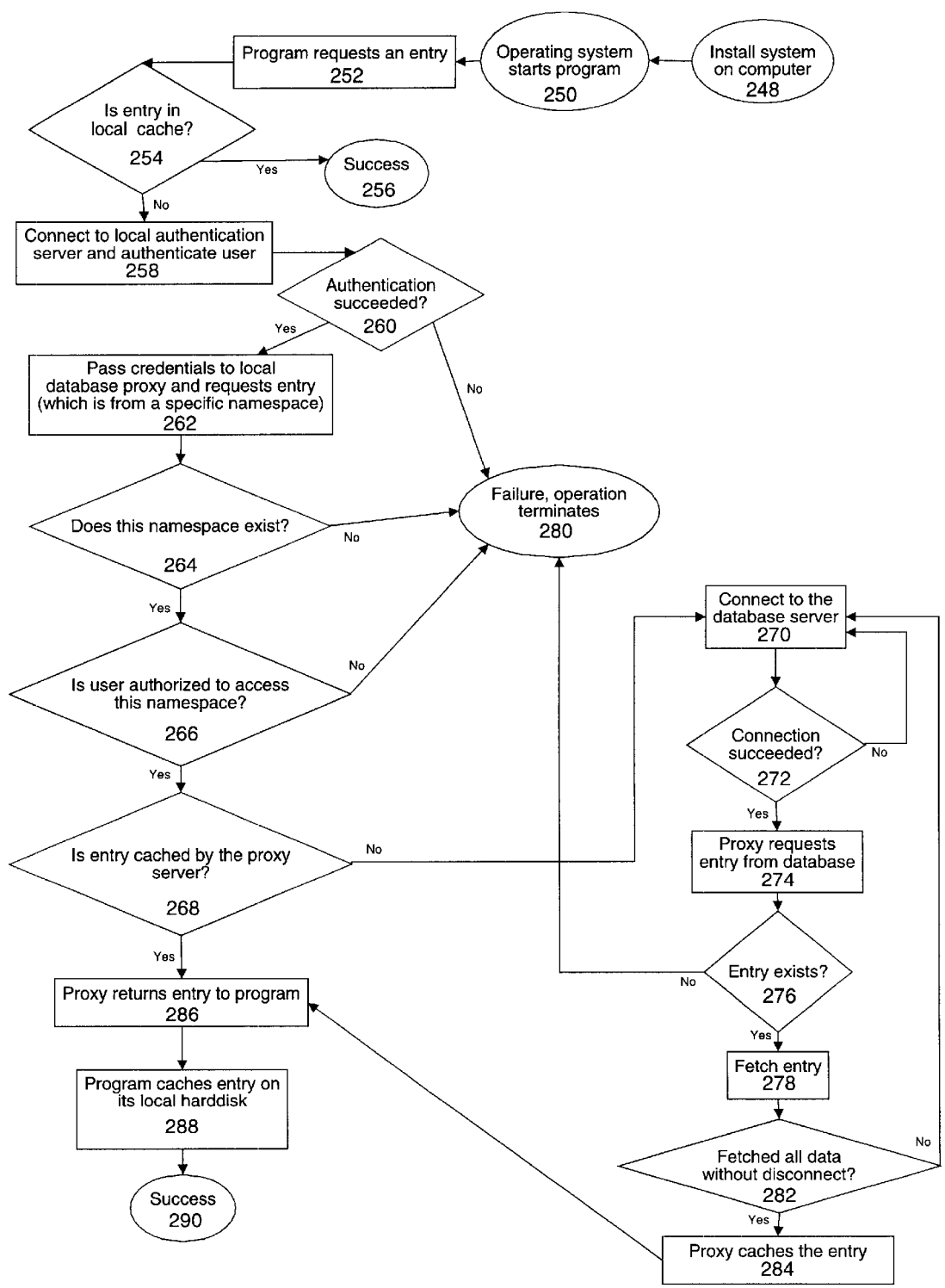
FIG. 3 is a general flow chart for requesting data in a system for asynchronous transmission, backup, distribution of data and file sharing.

Operating in parallel and as a mirror image other process, which is enabled by system 10 contemporaneously, is the requesting of entries by the user/requestor and which is set out in FIG. 3 when read in conjunction with FIG. 1.

Requesting Entries

As best illustrated in FIG. 3, with Reference to FIG. 1 and FIG. 5, again the program and as such the system 10 must be installed on the computer 248, said installation needs to be done only once. The user/requestor/inserter 22 communicates with the program and gives direction thereto. The system 10 is started 250, and in accordance with the inherent protocol, directs to request an entry 38 from a specific namespace 70. As part of the system 10 the authorization to retrieve an entry 38, by requesting same, under a given namespace 70 resides therein. First, system 10 checks the local cache 254, and if the entry resides therein 58, the program has succeeded 256. If the entry does not reside therein the local cache 58, the program/system 10 connects to the local authentication and access server, and authenticates itself 260. If authentication succeeds 260 and passes its credentials (id) to the local database proxy, there is an instruction to request an entry from a specific namespace 262. If the namespace exists 262, the proxy checks to ascertain whether the specified requester/inserter is allowed to request entries from this namespace 266. If the user/requestor/inserter 22 does not have the requisite authorization, access is denied 280 and the procedure fails/terminates 280.

If the requested entry is cached by the proxy the process continues to the next stage 286. If the entry 38 does not reside in the proxy cache 56, the proxy will then attempt to connect to the database server 270, and will continue its attempts to connect 272 until it succeeds in its connections.

Once connected to the database node 72 the proxy cache 56 requests the database for the entry 274, by (1) achieving authorization and (2) by passing the needed credentials namespace 70 for the location-based access control 16, and (3) by using the namespace the proxy transfers requested data locally. If the entry exists 276 the entry is retrieved to the proxy 278. If on the other hand, not all the data was downloaded 282, by user/requestor as by an interruption thereof, the program will reconnect 270 and again send the requested data to the user/requestor/inserter 22. Once all the data has been downloaded, the proxy caches the data in its cache 284. The proxy then returns the data to the program 286, which caches the data in its own local cache 288, and now has successfully downloaded the data 290. The system will then stand ready to repeat this process with other requests.

Unlike the prior art wherein a distributed file system relies on direct interaction between the user/requestor/inserter 22 and a fileserver, system 10 utilizes a tripartite system where the user interacts with a storage utility of Server Database Node 12 which in turn runs an insert protocol as per FIG. 1 to place same in a Server Database Node 12. The backup system of FIGS. 6, 7, 8, 9, 10 and 111 does not change the way the user/requestor/inserter 22 works, except to the extent that it works on the file system as a whole. Accordingly, a backup in accordance with the FIGS. 6, 7, 8, 9, 10 and 111 does not replace a fileserver per se but is a layer on top of an existing file system, to export a snapshot of files/data over existing firewalls while preserving the ability for the user to work on the file while distributing a version of the file to others. The user 22 can request/insert 50 and work on the data without having to obtain the data from the actual fileserver wherein it resides.

The user "checkpoints" the system, that is defines a schedule for the backup of the file system. Periodically, as illustrated by FIG. 6 the system discovers by comparison all the changes that have been made to the file system since the last checkpoint. To effect this end the user specifies either a virtual volume or a hardware solution to store all periodically generated backups.

Consequently, periodic backup(s) of data and concomitant request(s) by third party users/requestors and transmission to other database nodes and/or users/requestors, insures that there are multiple central and local versions of the data maintained as an immutable copy thereof. Such a system allows the user to restore files after a crash occurs, access a file deleted by mistake, compare two versions of a file and provide the user with remote access to his/her files. The aforementioned is set out in FIG. 11.

For purposes of illustration only, and in accordance with FIGS. 1, 2 and 3 the instant invention may be described in terms of user/requestor/inserter 22 and secondary user/requestor/inserter nodes 22. Alternatively, the system can be described, in terms of all nodes being equal.

Referring to FIG. 5, the preferred database 14 is assembled of immutable entries 38 but alternatively the database 14 could be compiled as a standard relational database (Oracle), an FTP (File Transfer Protocol) server, and/or a key/value database with mutable entries (Berkeley Database). It is further preferred that the insertion of data 34 (also referred to as value FIG. 5) be achieved on a group insert 86 basis by employing an "all or nothing" insert protocol as shown in FIG. 5, with the data 34 comprising at least a single data packet. The group insert 86 should create a locking modality to lock the resource the user is writing to (so that others are prevented from writing to or in any way changing the same resource) and provides concurrency control. As an alternate embodiment the inserted entries may be removed, that is by enabling a "one-way action" an authorized user can delete the data from the entry but the data may still reside on other node(s).

Overview
1. System installed over existing software to hard-drive or file server.
2. System installed on each user's pc.
3. Each user dedicates a folder for export to other parties who are able to share the data, and this folder resides on user's hard drive.
4. If a user wishes to transmit and distribute data evolved by user, user merely stores data to the designated folder.
5. Asynchronously, the program periodically creates snapshots of the designated folder's contents and stores them in a queue.
6. The program loads each snapshot from the queue and stores it on a database server.
7. Asynchronously, the users who have subscribed to this folder connect to the database server and download the news snapshots to their computer.

For purposes of the instant invention the term asynchronous may be defined as the user/requestor/inserter does not have to be connected to a network at the same time as any other user/requestor/inserter or contemporaneously with the insertion or request of data to the database.

Implementation

As per FIG. 1 and the method of FIGS. 2 and 3, system 10 in accordance herewith facilitates the sharing of data to proceed at the same time, in an asynchronous manner. While asynchronous activity typifies the system, the only exception is that the implementation of the "set up" of the system 10 which must be completed prior to sharing, one must install the system 192 as shown in FIG. 2 and as set out herein.

In FIG. 2 in order to effect export of files, as by distributed file sharing, the user/requestor/inserter must set up and name an export file 194 on the user's/requestor's hard drive (e.g. "C:\my documents\project 1" and hereinafter referred to as the export folder). The export folder will be a designated folder for export and sharing of all data for a designated number of users. More specifically, system 10 can accommodate the set up of more than one export files to support sharing and transfer to different groups of users/requestors.

All designated receivers (those who have requested the data as a user/requestor/inserter) of the shared data must also "set up" the system and the sharing program FIG. 3. The sharing program will back up the files in the export folder 88 of FIG. 19 at certain time intervals to provide all users with a chronologically complete file snapshot 78. This backup may either constantly run at intervals or be actuated by the user.

As seen in FIG. 2 the system 10 will generate a random identifier 196a ("id") for the data to be exported from a specific export folder so that different data (different exported files) can be transmitted or shared with different sets of end users. The system will also generate a random encryption key 196b, the data is encrypted thereby and can only be browsed/received by users with the correct key. The user can direct which other third party users may access or share the data by giving them the id and key for a specific exported folder 198. For purposes of this embodiment, the term "id" may be defined in terms of the location based access control namespace 70. For example, using hash-based location based access control, one would use a random string of data, the hash of which is sent to the third party users so that the third party user(s) can access the data only in this namespace. A hash is the result of a cryptographic one-way hashing function such as SHA-1 or MD5 (algorithms). There are several methods for distributing the aforementioned keys: (1) send by writing, oral, telephone to the user/requestor/inserter or (2) a two level access control whereby the keys are stored in a key database to which the users/requestors identify themselves using an existing authentication system and this authentication proxy handles retrieving or inserting data on behalf of the users.

As stated herein, a storage interface in accordance with FIG. 5 is established on the database node to provide what is in essence a lookup table 36. Each entry 38 is stored with keys 32 and values 34, and once an entry 38 is stored using key k, then it will not be updated, deleted or in anyway changed. The preferred storage interface may be described in terms of an immutable database. Alternatively, by treating a folder on a hard drive, such as an FTP server, as a simple database with the filename serving as a key and the data in the file is the value a similar end is achieved.

As a preferred modality the following processes may run simultaneously:

(1) the user may save the data to an export file residing on the hard drive or file server;
(2) the file(s) from the user's export file are stored in at least the database node;
(3) the secondary subscriber nodes fetch the stored data from the database nodes;
(4) a recipient of the data may browse its files and folders on their hard disk.

According to one embodiment, the user/requestor/inserter simply stores files and folders he/she wishes to export in the folder specified as the export folder.

By comparing the modification times and hashes of the files and the folders, to those of the previous snapshot, the system ascertains whether or not changes have been made to the files in the export folder. If a change has been made a new snapshot (dumping of the files to the export folder) is effected and the process continues by creating a new snapshot, which has three parts, encrypted with the export's encryption key:

(1) a file that contains a listing of all files, their names, sizes, hashes, owners and other file system meta-data (e.g. permission(s));
(2) a zip file (defined as a file format that allows one to store multiple files inside a single file, optionally compressing the file(s)) that contains all the files that have been changed or created since the comparison snapshot (by comparing the hashed information); and
(3) another file that contains the date and time of the new snapshot (the correct time should, when possible, be fetched from the database node).

As best set out in FIG. 6 the snapshot's entries are created by the following process. First, a time entry containing the current time and date is added, said time and date is provided by one of the database nodes 100. It is presumed that the user's date and time is incorrect but the database node's time and date is correct. Next, for each file in the export folder 102, the system checks if the file (or the folder it resides in) has been changed 104. If it has, we calculate the hash of the file 106 and check if any file with this hash has been stored in a previous snapshot (we keep a record of these) 110. If the hash does not exist in the previous snapshots then the file is added to a zip file (a zip being any compressed file format) under its own hash identification 114. If the file's size and meta-data has not been changed, we can get its hash by retrieving it from the listing entry of the previous snapshot 108. As system 10 scans through the files that exists and creates a listing of all the files and folders their meta-data, specific information including information, file size, owner, date/modified and hash 116.

The new snapshot—composed of the three created files set out hereinabove—is then added to a queue folder 120 and when an Internet connection 20 (e.g. a permanent LAN connection or a dial-up connection via modem) is achieved the new snapshot is sent to the database node, as described in the next section. It is required that for each entry the three file types are inserted. The snapshots are stored using the unique "id" for this export folder and a version number, so that the first snapshot created is stored under version (1), the second under version (2), the third under version (3) and so on.

Queue Function

Figure 7:
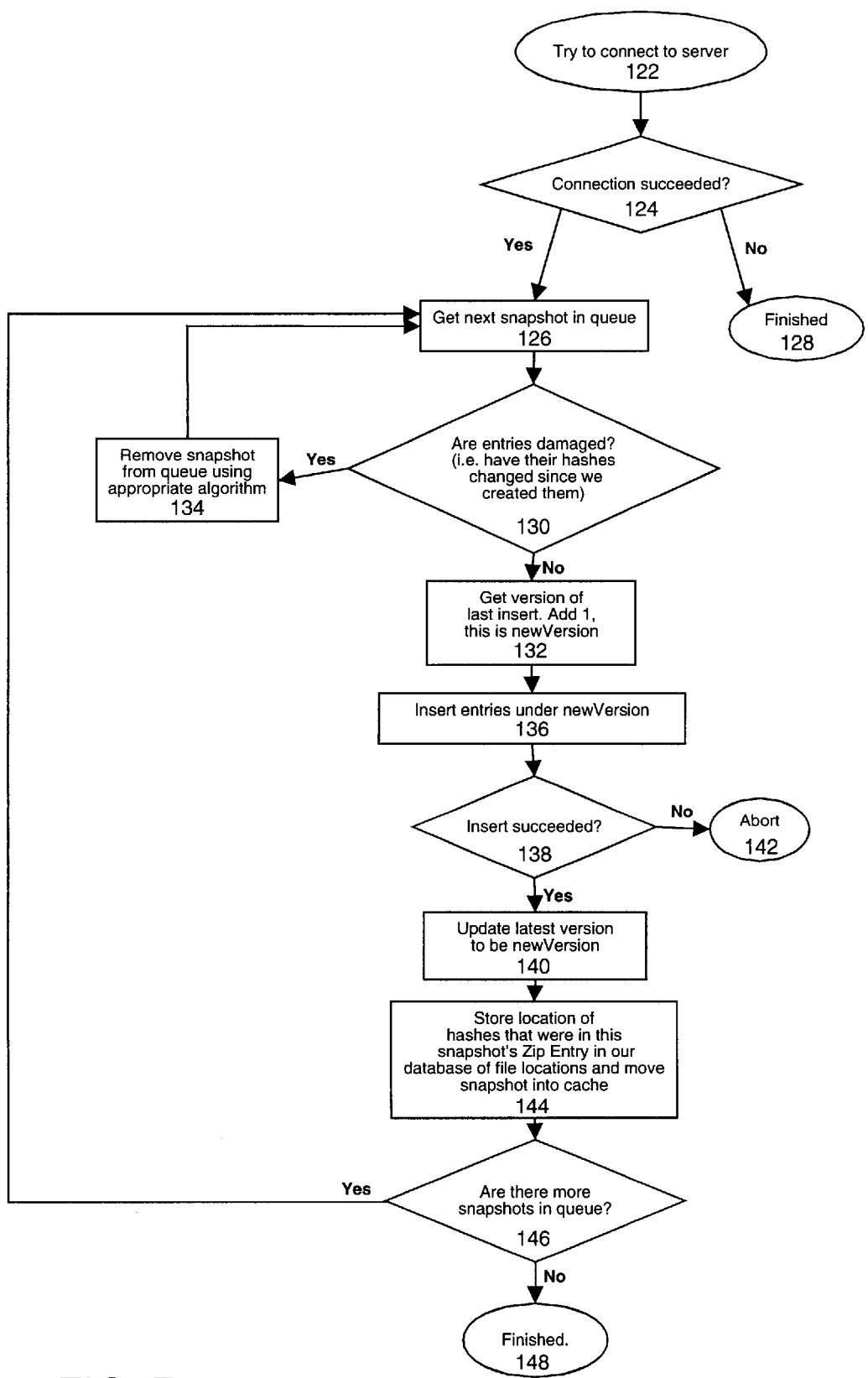
FIG. 7 is a flow chart showing a method thereof for clearing the queue.

When inserting entries as depicted in FIG. 7, into the database, said entries are stored under a key. Each key has three parts (1) a specific identifier also referred to "id" (a random string of data generated for this purpose); (2) a version number; and (3) the string "zip," "listing," or "time" depending on the type of file. For example, if the "id" is [abc] and it is the third snapshot, one inserts three new database entries (1) abc zip 3; (2) abc listing 3 and (3) abc time 3. Part (1) is defined using the specific namespace for this export, and (2) and (3) compose the tag (see the section on location-based access control). This process is an all or nothing process. All data which makes up the entry must be inserted at once or the entry fails and nothing is inserted. Moreover, it is preferred that the version is inserted under the next version number if the user is connected to the network.

If the user is not connected to the network 78 the snapshot, which is composed of three entries, is queued as a group, without a version number. The snapshot once queued will be stored locally and will queue the snapshot in chronological order to accommodate the physical limitation of the storage area and to obviate damage to the files in the queue. Thus mislabeling is prevented as is two snapshots with the same version number. Consequently, since it is only the changes to the export folder which are stored, that is storing only those files which have changed since the last backup of data actually stored in the data base, if a single change is lost the data base remains secure.

Clearing the Queue of Backup Entries

As illustrated by FIG. 7 the system tries to connect to the database 122. If it can connect to the database 124, as through a network connection or Internet the process can proceed, if the system cannot connect to the database server the process fails 128. After connecting to the server the next snapshot in the queue is loaded from the local storage 126. We calculate the hashes of the entries in the snapshot and compare to stored values 34, these values having been stored in FIG. 6 stage 120. If the hashes have changed that means the queued snapshots have been changed, and we must execute the algorithm described in FIG. 8. Otherwise, the version number of the previous snapshot is loaded, said version number being increased by an increment of one 132, and the entries are moved from the local storage to the database server over the network. The entries for this snapshot will then be inserted in the database under the new version 136. If the insert succeeds 138 the snapshot is removed from the local queue. It is noted in local storage that the hashes in this snapshot were stored under this snapshots version, and the entries are moved from the queue to local cache (a designated folder on the user's computer) 144. The system searches for more queued backups 146. If there are more, the process repeats itself, if not the process terminates 148.

Figure 8:
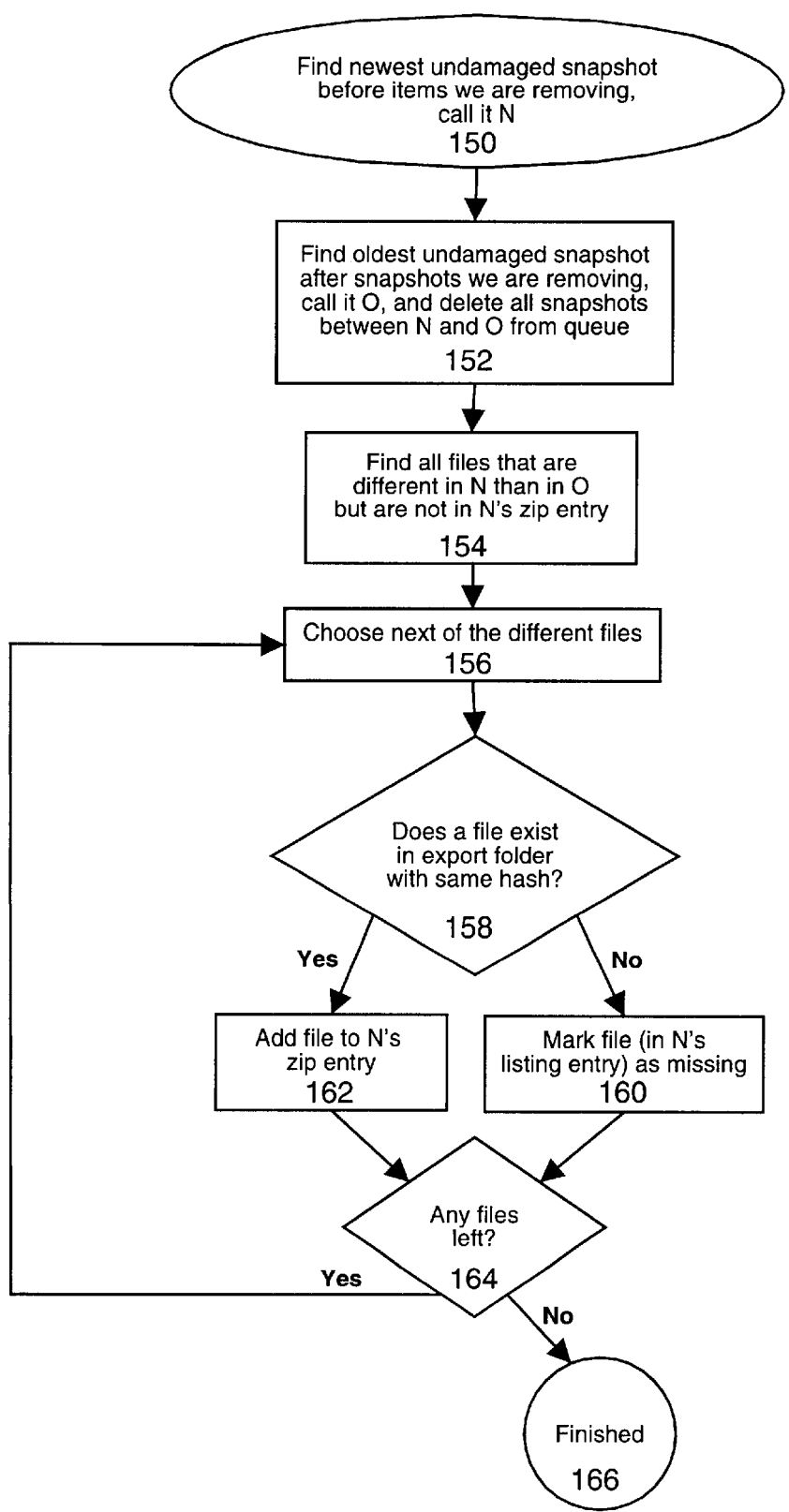
FIG. 8 is a flow chart showing a method thereof for fixing damaged entries.

The algorithm for removing damaged snapshots from the queue is described in FIG. 8. The system searches for the last undamaged snapshot where the hash entries match, which is either queued or stored. The snapshot is referred to as N 150. Next we search for the oldest undamaged snapshot, referred to as O, and delete all the damaged snapshots from the queue 152. We compare the listing entries of N and O, getting the list of files that are in N's listing entry but not in O's listing entry 154.

For each of the files so found 156, does this file identified by its hash exist on the export folder, with the same hash 158? If the file does exist the system adds the file to n's zip entry 162. If the file does not exist the system marks the file as missing in n's listing 160, since there is no way to retrieve it. We continue this process 164 until all the missing files that can be salvaged have been added to N, and then we are done 166.

Figure 9:
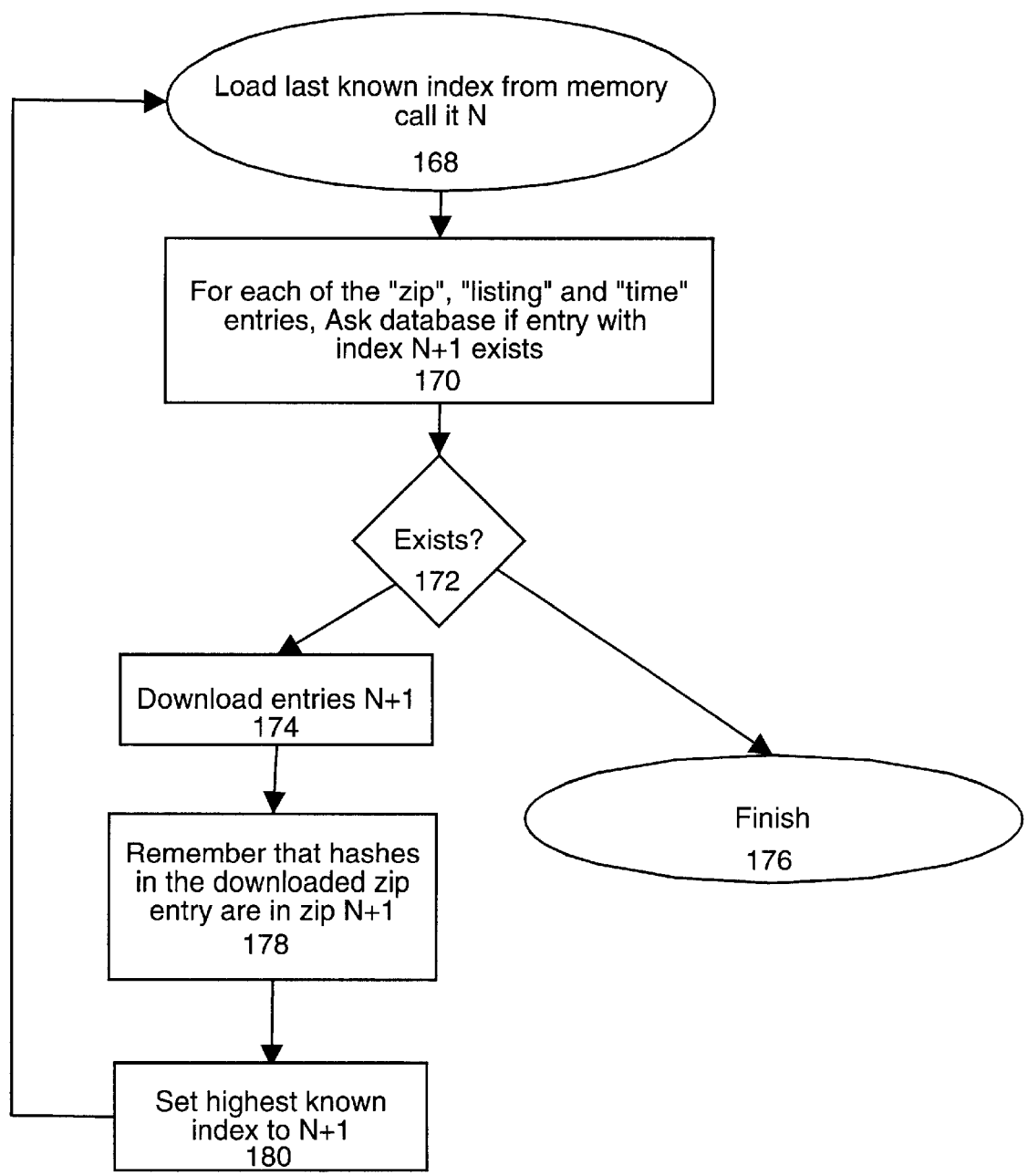
FIG. 9 is a flow chart showing a method thereof for retrieving snapshots from the database area.

The system in accordance herewith downloads the stored snapshots, when the user connects to a dial up connection as by connecting to the Internet, as described in FIG. 9. The system effects this end by checking the database node for new updated information on a timed basis by asking for any entries with the specific id for that export and a version (i.e. if the system had already downloaded a version N 168 the system will ask if there is a version N+1 170, if N is the last version). If they do not exist we are finished 176, since no new snapshots exists. If they exist 172 the system downloads the three entries (the time entry, the zip entry and the listing entry) to a specific folder on the local computer 174. Then, in each snapshot it loads it checks which hashes are stored in that snapshot's zip entry. This information is stored on the system's local database, so that when, in Process 4, the system must get the data for a specific hash it will know in which zip entry it is stored 178. The highest known version is now N+1 and this information is also stored 180.

Thereupon, the user can browse the contents of the dedicated file to ascertain its contents. Browsing occurs by viewing a list of cached files. The cached files may be listed in accordance with date, so that the user upon opening a date browses files from that chronological moment. Thus we see in FIG. 10, a graphical window from a file manager 40. Each snapshot is represented by a folder icon 42, where it's name is the date of that snapshot, loaded from the time entry of that particular snapshot. So see one snapshot whose name 44*a* is the "16:00, Apr 2", while a snapshot from 15 minutes later, has the name 44*b* "16:15, Apr 2".

Figure 11:
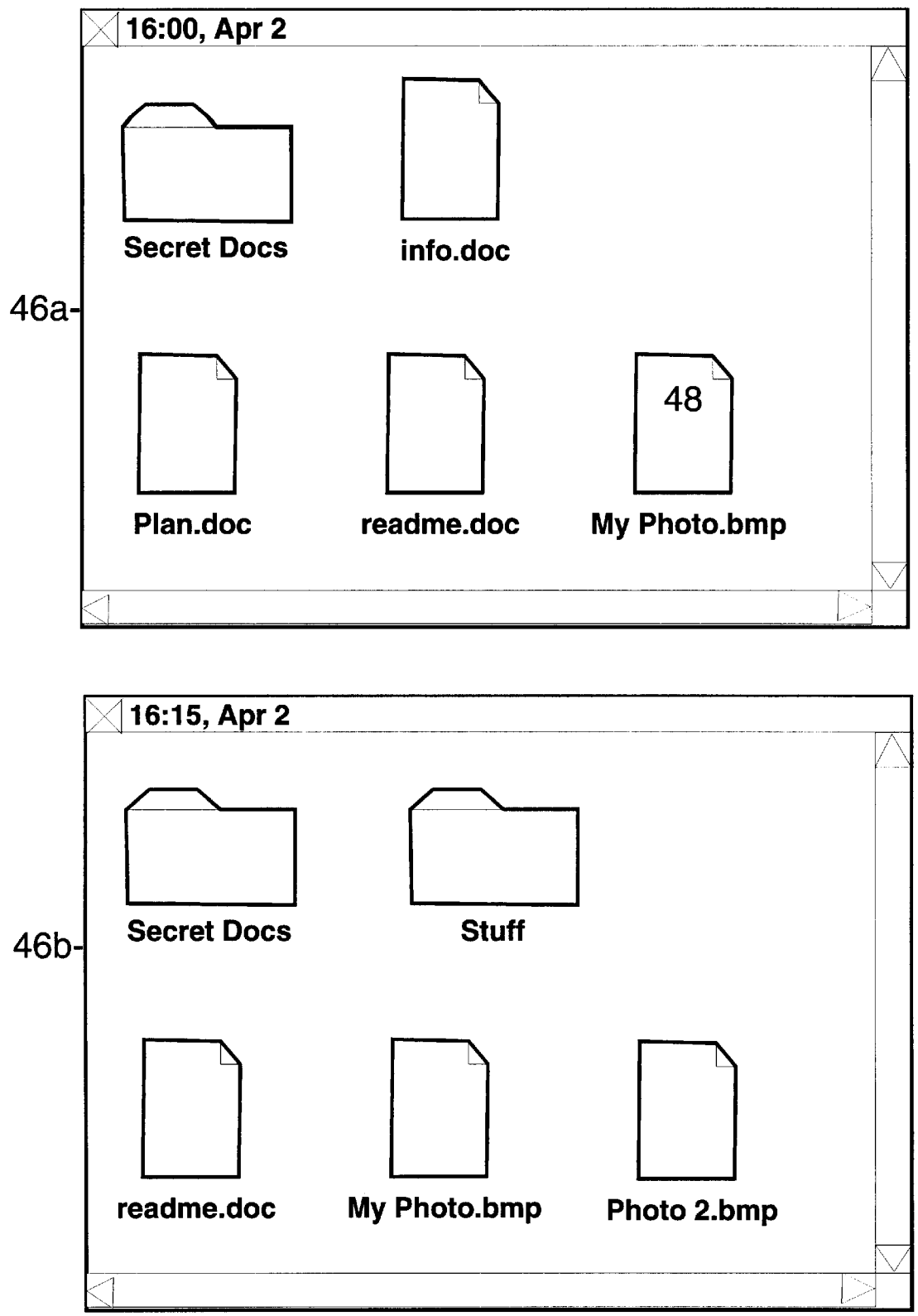
FIG. 11 is a diagram of browsing the snapshots on the file level thereof.

If the user then specifies a particular snapshot, as we see in FIG. 11, the snapshot is also seen as a graphical window 46*a*, 46*b*. Each snapshot shows its contents, with files contained in the snapshot looking as regular icons in a graphical file manager 48. As can be seen in FIG. 11, different snapshots display the different contents of the snapshotted filesystem at the times of the snapshots, even if the filesystem has changed since then.

To browse the backup in accordance with FIGS. 10 and 11 the user may graphically or visually interact therewith so that the contents including: file listings, sizes, folder structure, may be created from the listing entries as a lookup table. In order to effect browsing a backup to access the contents of a file, the following method is employed: For each file in a snapshot, the listing contains the hash of that file. We locate the local zip previously downloaded that has a file whose name is this hash, and extract the file from it. The system loads the file into memory and returns the file to the user, but if the user modifies the file, it must be stored somewhere else since the files are marked as read only.

In browsing backups a list of folders, whose name is a date, of all stored backups and queued backups, may be created by the algorithm set out hereinabove. The system can differentiate between stored backups and queued backups (visually by color, by font, by character code etc.). One such protocol provides the user with viewing only landmarks (files or data which are in final form—not being changed for a specified amount of time or by user specification).

As best seen in FIG. 19, System 10 is constructed as containing an overall architecture wherein there should be at least: a library and utilities system 94; a database 14, and a utilities 93. The library system may be preferably constructed via a programming language to assemble a set of libraries and to string said libraries together. Hence, by stringing or setting up the library system, the system may be constructed. One such programming language is Python, which enables the user to set up the network and library system. Other programming languages like Java can be used.

The library system 94 to be set up on the database node preferably includes at least a single host key/value database 14, and must function in a TCP/IP environment. Hence, the TCP/IP environment not only provides the user with a connection to the network, but also insures that messages that are sent first arrive first. Simply, it orders communication among computers 94*b*. It is a preferred embodiment that threading is enabled so that the system can handle two or more tasks within the same process.

To the network system 94*b* in accordance with that set out hereinabove, a database 14 to store the data must be constructed. Such well known database programs as (Sleepycat Berkeley Database, or Oracle) may be operatively substituted without modification. The database must at least enable one to store values under keys. The database does not have to be distributed, but merely must run on at least one computer, and can be written in any language (for example in Java or C).

As stated herein, the operating system 98 is without moment. Such systems as Windows, UNIX or LINUX may be used without regard. While the system may be running on a network, people who are sharing data from the database of a server on a permanent connection to the network, and the end users can connect to the network, this is not a necessity. A prominent aspect of the system is that the user can work on data without being connected to the network at all times. This is the asynchronous component to the system. As the only caveat to the asynchronous aspects of the system, one must be able to at least access the database node (although this access need not be available at all times) by means of a modem, DSL connection, wireless, corporate network, LAN, WAN, or either over a network or dial up server.

An encryption library 94a may also be included. In this regard the encryption function must at least allow simple data encryption, transport, network connection, and authentication by private and/or public keys, hashes, smart cards or any authentication means. Moreover, this function must facilitate the locating, reading of and writing to files.

In addition there must be graphic interface 96 to enable the user to visually and physically interact with the environment. The user must be able to input data from user and output data to the user. In addition, the system must facilitate browsing, to provide the user with a visual output of what data/files are being backed up.

Storage

The Server Database Node 12 as described herein and illustrated in FIGS. 5, 12, 13 and 14 operatively employs the use of a lookup table 36, of immutable entries, said entries being stored by unique identifiers—said identifiers for the instant embodiment being keys. Each key 32, denoted by (k) possesses a corresponding value 34, denoted by (v) which cannot be modified (updated), deleted or otherwise changed (replaced). Therefore, once an entry is created for a given key with a given value, the value under that key cannot be updated, deleted, or replaced. Instead, other versions of the data may be inserted pursuant to that key but with a unique and chronological version number. The storage modality is basically a generalized database for key/value pairs, where the data is immutable.

FIG. 5 The storage modality preferably supports the following logical operations: (1) insert data (k, v) to create a new entry with key k and value v, with the preferred limitation that a number of inserts can be committed together a group; (2) request data (k) return the value v, stored under key k, unless there is no such entry, if there is no such entry the return will be FALSE (the request also returns meta-data for the entry: the time of creation and size of the entry); and if appropriate (3) data exists (k) if the data exists as an entry with key k a TRUE will return.

A preferred limitation obtains to the insertion of inserts as a group. A group insert is an operation wherein one or more insert operations are committed together 86. A series of insert commands are sent to the server, but they are not committed.

The user then sends a commit command, and the server attempts to commit all the inserts by adding the key/value pairs to the database. If the commit fails, the user can change the key or value for a specific insert. This characteristic vests the database system with a high degree of consistency not heretofore found, and saves bandwidth by not requiring retransmission of data when a commit fails. Group inserts should be committed using a two-phase commit. That is, the commit stage is divided into two stages—a prepare stage, and a commit stage. The database must return TRUE on a prepare command only if the commit command will succeed.

When requesting an entry under key k, the look up table will search the entries to either return the value v stored under (k) or determine that none exists. If the entry exists the key (k) will return the data as a true response, as well as returning the meta data for the entry (meta data–time of creation and size of the entry). If no entry exists a false indication will return.

As stated hereinabove, basic methodology of programming steps effects the following as overall steps: (1) insert; (2) request; and (3) existence. Notwithstanding the program (Windows, Unix etc.), storage can be implemented in accordance therewith as long as there is an identity of operation and application protocol interface.

EXAMPLE

Consider a newsgroup, where postings are inserted using keys on the form "Posting 1", "Posting 2", "Posting 3" . . . . The way you'd create a new posting is by finding the highest posting number, say 37, and then inserting the new posting as "Posting 38". If someone else beat us to it, we insert as 39 instead, etc. As we can see, in many cases the data being inserted remains the same, and we try to insert it under different keys.

The protocol should therefore be stateful. Even if the insert of an entry fails, we should be able to change its key and try inserting it again, without re-transmitting the entry's data, which may be megabytes in size. The protocol looks something like this:

User: Set the data to for insert "1" to "Testing, 1, 2, 3".
Server: Ok.
User: Set the key for insert "1" to "Posting 12".
Server: Ok.
User: Set the data to for insert "2" to "Another test".
Server: Ok.
User: Set the key for insert "2" to "Posting 13"
Server: Ok.
User: Prepare to commit the inserts.
Server: Can't do that (an entry with key "Posting 12" already exists).
User: Fine, set the key for insert "1" to "Posting 13".
Server: Ok.
User: Set the key for insert "2" to "Posting 14".
Server: Ok.
User: Prepare to commit the inserts.
Server: Ok.
User: Commit the inserts.
Server: OK, committed.

At the end of this process, the user has inserted "Testing 1, 2, 3" under "Posting 13" and "Another test" under "Posting 14".

Benefits of Immutable Entries

Pursuant to FIG. 5 system 10 in accordance herewith, supports the use of immutable entries 38 in a database as an advantageous embodiment. First, immutable entries provide a historical listing of changes made to a database, and instead of replacing an entry with new data, one inserts a new entry 38 with a new key 32. As a result, and depicted in FIG. 11 this allows the user/requestor/inserter to view older versions of an entry and compare them with the latest one in order to insure that the user/requestor/inserter acknowledges the most recent version of the data.

Another very important benefit of immutable entries is scalability and the ease with which one can build a distributed database in accordance herewith. The aforementioned is best set out in FIGS. 12 and 13 with reference thereto. The prior art is rife with a variety databases, where entries are mutable or may be changed. In order to achieve distribution thereof, data must be stored on multiple servers because of reliability and scalability issues, not the least of which is insuring that at least some data is existent therein. However, when a user/requestor/inserter requests an entry from a server with mutable or changeable entries, one cannot ascertain whether the data has been changed on one of the other servers. There is simply no way to tell whether the data that stands before the user is original, a modification, a version or some other manifestation thereof. To wit, two authorized users may be working on what they believe is the same data only to find that in reality the data has been changed. As a consequence, to use a mutable database one needs to implement complex algorithms in order to regulate and insure that all the servers have the same version of the data. In the system 10 in accordance with the instant invention, once an entry 38 has been created in Server Database Node 12 and stored on others, the user/requestor/inserter is secure in the knowledge that it will never change. Hence, there is no need to query whether the data has been changed, an advantage of a database comprised of immutable entries. As stated herein and incorporated by reference, caching proxies 56 and local caches 58 as illustrated in FIG. 14 never have to validate their entries—their entries are always correct, since the entry once inserted simply cannot be changed on the Server Database Node 12. From the main database, the originating node, the entry 38 remains immutable. In view of the data in the local cache 58, which is maintained in a consistent state, and will never be changed, adding support for disconnected operation which is facilitated thereby. For example, this modality is particularly suited for wireless applications where being disconnected is an ongoing threat. The disconnected operation permits continued operation on data even when the user is disconnected from the database server.

Semi-Immutable Database

In certain alternate applications pursuant to the instant disclosure, deleting entries may be necessary (e.g. in order to save space). This goal is achieved by using an alternative embodiment of the database so that entries can exist in at least three states—Empty, Full or Deleted. An entry at an originating location starts out in the Empty state. When data is inserted it becomes Full. When we delete the contents of the entry it becomes Deleted. These state transitions are one way—once an entry is in Deleted state no data can be inserted into it.

The design of the application(s) built upon a delete-capable database storage should not rely on deletion in their algorithms, although the system should be able to handle it. In a distributed storage system the information in an entry 38 can be cached in many different places, and the information that an entry has been deleted may be propagated only after the deletion operation was originally executed for a specified time period. That is, the system is not adding a deletion operation—rather, the system preferably allows its applications to mark entries as unnecessary, enabling the storage server(s) to delete them, but in no way guaranteeing that all copies of the data will actually be destroyed.

Distributed Server Architecture

FIGS. 1, 12 and 13 illustrate the system 10 accordance in herewith and further sets out a server/client type architecture where there is at least one server side and at least one client side. The server a node where the aforementioned Server Database Node 12 resides. The originating node may be a client node or user/requestor/inserter node and has the ability to connect to the Server Database Node 12 and insert or request entries therefrom. The foregoing may be represented by such servers as an existing network 18 or an Internet, Intranet, WAN or LAN system. This architecture may be defined with regard to system's 10 ability to be layered on top of existing operating systems and itself being composed of layers. A server can be implemented by a single computer in which the data is stored. This computer accepts, on a centralized basis, all inserts 50a, 50b and requests 50c of data from Server Database Node 12.

In another embodiment, a purpose of which is to prevent loss and damage, there are a plurality of servers, instead of one, constructed as a distributed database. The multiple servers must present the same interface to the user/requestor/inserter 22 and act, in effect, as if they were a single server, and therefore must have the same single consistent state. The multiple servers can be organized in different ways, in order to implement these requirements, but are essentially equal.

In accordance with FIGS. 12 and 13, the storage of data is implemented on a distributed basis, so that the immutable copy thereof is maintained preferably on more than one Server Database Node 12, so that the program will run on multiple networked nodes but implementing a single logical storage. As an absolute there must be only one possible entry 38 for each key 32 (no two nodes 72 can have different entries under the same key); and inserting under a key 32 that is already stored in at least a single node must result in a failure to insert. In addition, it is necessary that the request of data 34 from any node using the correct entry access information must return the same data 34 notwithstanding the node 72 so specified.

FIG. 12 One such embodiment is Gifford's voting algorithm. To effect ordering the acceptance, storage and distribution of data, the database is comprised of more than one server, with all servers being equal. The system requires that there is a unity of voting servers returning the same answer. Therefore, the user asks the server connected thereto to insert a snapshot of data. The server so requested generates the requests to the majority of other servers connected therewith. For example, if there are 5 servers and N is desired to be inserted the servers will query 2 other servers as to whether N exists. If all servers return an answer that N does not exist the entry will be inserted, and sent to all the servers so that they too will store it. If at least one server responds that N exists the proposed insert fails. When requesting an entry from a server then a majority of the servers will be queried as to the existence of data stored thereon. If all servers return an answer that N does not exist the request will fail. If one of the servers has the data it will be returned to the user.

FIG. 13 Another embodiment is the primary copy algorithm. In this algorithm, a single node is the primary node, and there are a number of secondary nodes. When requesting entries, one requests the desired data from the secondary nodes. When inserting an entry, the entry is only inserted using the primary node—it ensures the insert is possible, and if it is possible it commits it in its local copy of the database, and then sends the newly inserted entry to the secondary nodes so that they know of its existence. Since the primary node is a single point of failure, it can be replaced by a group of servers that are synchronized using the aforementioned voting algorithm. Thus there are two layers of servers—a core group of primary servers that decide if inserts are possible, using Gifford's voting algorithm, and once they have decided send the inserts to the secondary servers.

Yet another embodiment relies on primary nodes, being assembled from multiple servers, so that each server is responsive to inserting only selected data. Therefore, the user who wishes to insert information into one of the primary servers will transmit the same, and the primary servers will only accept the data based on key space values. For example, a primary node or server may be able to accept volumes delineated as a–c but not d–f. As a result, data is not centralized and inserted material is less likely to be lost if there is a catastrophic failure of the system.

Caching

FIG. 14 since the entries in the database do not change, major speedups can be had by caching the data requested from the server on the local machine's storage. In the future, when we want to get that entry, we can load it from our local cache instead of having to communicate with the server.

In addition, caching proxies can be used to relieve the load off the main database servers and to share the benefits of caching among users who are on the same network. A proxy cache 56 is server that does not have the storage aspects of the database. That is, it cannot commit data to the database, it sends requests and inserts over to a real database node, but it can serve data it has cached locally if it is available. If the user wishes to request data, and that data is not in the user's local cache 58, then the request will be passed on to the caching proxy server. The proxy caching server will process the request and ascertain whether the requested entry resides on its local disc storage (i.e. hard drive). If the request does not reside locally, then the proxy will query the Server Database Node 12 for the requested data. The returned data is returned to the user and stored locally on the proxy's cache so that future requests may be served from the cache, with no need to contact the primary server, and it is also stored on the user's local cache. Inserts are passed untouched on to the database server.

Access Control Motivation

FIG. 15 best illustrates access control motivation and provides a clear depiction of the relationship among individuals or user/requestor/inserters 22, groups of networked users/requestors/inserters 22 of company A and Company B, the Internet 18, and Server Database Node 12, which is accessible through the Internet 18. More specifically, the aforementioned figure, sets out the relationship between each node and the server node. For example, user/requestor/inserter 22 must store the appropriate key on his/her own personal computer, so that once connected through the dial up connection, DSL, modem or other connecting device 20 the user/requestor/inserter 22 can locate the information in Server Database Node 12. While user/requestor/inserter 22 as an individual stores the key itself, when used in a networked environment authentication server 28 stores the key behind firewall 30 so that when requests or insert commands are made via connecting device 20 over Internet 18 to reach Server Database Node 12 the location can be accessed thereon.

Consider a simple key/value database that needs to have the following levels of access:
write and read access,
read-only access,
no access at all.

For example a newsgroup might have some users that are allowed to post and read articles, another group that are allowed to read articles but not post, and all other people should not be able to read postings.

In addition, we want to be able to integrate with organizations' access control and user management systems, so that system 10 may be seamlessly incorporated when using this database. Moreover, system 10 is designed to work simultaneously between two or more systems which utilize a variety of operating systems, programs and with people who are not "networked" or related to such system as shown in FIG. 15.

System 10 achieves the aforementioned goal by utilizing a location-based access control. In a traditional access control system, you identify yourself as a specific user, and based on the permissions for that specific user access is granted or denied. The user of this prior art system must identify themselves using a secret only they know or posses. In contrast, the instant system 10, by utilizing a location-based system, anyone can read or write data, but the location is kept secret, so only someone who knows the location can actually receive the requested data.

Location-Based Access Control

In accordance with FIG. 16 uses the concept of a namespace 64 and it is preferred that database 14 is partitioned into a number of namespaces 70. A namespace 70 is composed of many different items of information, which we can differentiate between by giving each a unique tag 66. For example, a newsgroup may be considered a namespace 70, and then each posting in the newsgroup will be defined by a different tag 66 (e.g. "posting 1", "posting 2", etc.).

The preferred method for implementation this is by having the keys for the database divide into two parts—the "namespace" 64 part and the "tag" 66 part. All entries whose key's first part is the same are in the same namespace 64. Therefore, one creates a new namespace 64 by simply choosing a new random string of data for the namespace 64 part. Each namespace 64 will then have its own set of permissions. Unlike most access control systems, in location-based access control 16, the access control works by the fact that the "namespace" part of the key is random, so that a user/requestor/inserter 22 of the database must know it in order to read or write to entries that have it. Simply one must know the location of the data before one can request same.

Additionally, all that is required to "create" a new namespace is to choose a new secret random value and use that as the namespace part of keys. The server does not need to do anything to create namespaces, as it would in a user-based system.

Of course, as given, there are only two levels of permissions—whoever knows the namespace can read and write, and whoever doesn't know it cannot read or write to that namespace. To add an intermediate level of permissions, a mere change in the infrastructure enables same.

Implementation 1: Hashing Model

In accordance with FIG. 16 when the program of system 10 and a user/requestor/inserter 22 wishes to insert an entry in a database 14 thus protected, it uses an insert key 60, which has two parts—the namespace 64 and tag 66. The namespace part of the key 64 is a random string, the tag 66 differentiates between different entries in the same namespace. The location-based access control 16 then hashes the namespace (but only the namespace) and stores the entry using the hashed namespace 68 and the tag 66. When reading an entry from the database, we pass a request key 62 with the hashed namespace 68 and the tag, and the server then looks up the entry that is stored under this key in a specific part of the database defined by the namespace 70. To emphasize the point—when inserting the namespace, and it is hashed the key parts 68 are passed as is. If the user/requestor/inserter 22 does not know the hash, the user/requester/inserter 22 cannot request data.

If the user only knows the hash, they can read only. If the user wants to insert, it will be inserted under a new namespace defined by the hash and not inserted under the original name space. For example, original namespace is 1234 so that the hash is 5678. User is able to read 5678 (because user knows the hash 5678). If the user wishes to insert an updated version or modified version then the system will hash the value they pass (in accordance with user's key) so that the new hash (if they pass 5678) will be 9101112, and this will be inserted under a different namespace. So, as we wanted, we have three levels of access:

Whoever knows the namespace value can insert and request entries under that namespace.

Whoever knows the hash of the namespace can request entries for that namespace, but not insert.

Whoever knows neither can not even request entries that under this namespace.

Implementation 2: Public Keys

As shown in FIG. 17, as an alternate embodiment hereof, a user/requestor/inserter who wishes to create a new namespace may do so by generating a new private/public "keypair". When inserting pursuant to a "public key" method, the user provides an insert key 60 composed of the tag 66, the signature of the tag using the private key 92, along with the public key 90. For purposes hereof a public key may be defined as a family of cryptographic algorithms (e.g. RSA Algorithm). The location based access control layer of the Location-Based Access Control 16 verifies the signature, or it won't let the new entry be inserted. When requesting, the user only needs to pass a request key 62 the public key 90 and the tag 66, and it will get the entry's value.

Whoever knows the private and public keys can write and read entries into the namespace defined by the public key.

Whoever only knows the public key can read entries but not write.

Whoever knows neither can neither read nor write.

This implementation may be more preferred than the hashing-type in that database proxies can check that validity of inserts themselves, thus keeping the load of bad inserts from the main database servers. Yet another benefit is that proxies cannot insert unauthorized entries. Pursuant hereto, in the hashing system an unauthorized proxy can record the original namespace and use it to insert entries itself, but this is not possible here since the proxy never ascertains the private key. Still another advantage is that the hashing implementation appears to be faster and is a less costly operation than verifying a signature.

Reverse Location Based Access Control

Figure 20:
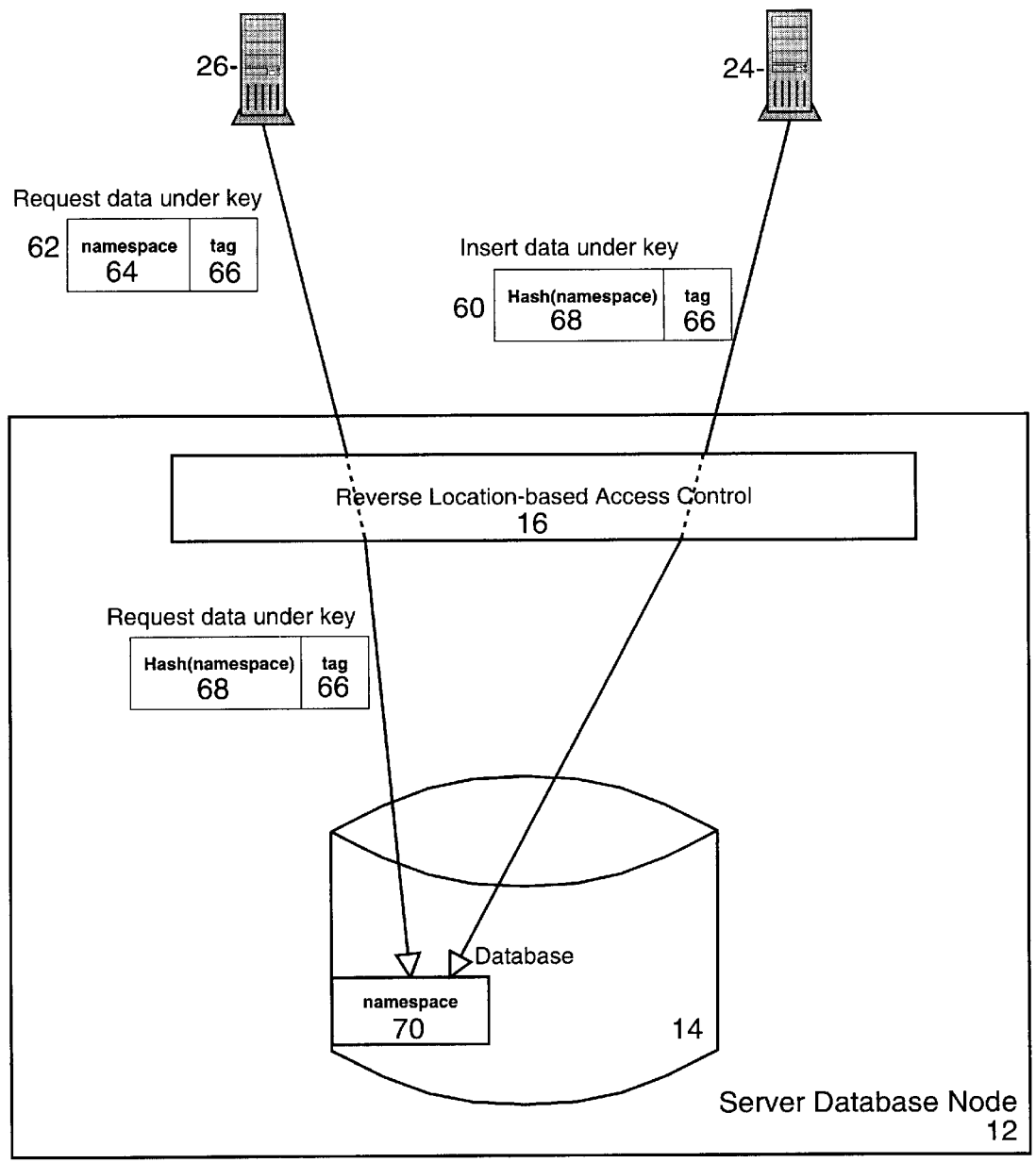
FIG. 20 is a diagram of reverse hash-based location based access control for asynchronous transmission, backup, distribution of data and file sharing.

The instant system 10 may employ a reverse location based access control in accordance with FIG. 20. By example, consider an email system. Alice and Bob want to send email to Carol by storing data in her namespace. Alice and Bob both have to be able to write to the namespace, but they shouldn't be allowed to read from the namespace. Carol can both read and write the namespace. Now, location based access control is not going to work in this case, since there anyone who writes can also read data. In order to overcome this problem the instant invention uses a system that is the reverse of a location based access control system.

For example, let's say one uses the hashing location-based access control implementation FIG. 16. Instead of hashing the namespace when inserting and passing the hashed namespace through untouched when requesting, we will do the opposite. When inserting we give the hashed namespace 68 and tag 66 and they are used to insert the data, and when requesting we pass the namespace 64 and it is hashed by the Location-Based Access Control Layer 16 and the resulting location's data is passed to the reader. In other words:

Whoever knows the namespace value can insert and request entries under that namespace.

Whoever knows the hash of the namespace can insert entries for that namespace, but not request.

Whoever knows neither can not request or insert entries that under this namespace.

Two-Level Authentication

The location-based access control above can be integrated with existing authentication systems in an organization (username/password as in Unix or Windows, smart cards, etc.). The following overall scheme may be used so that the user, working on his/her computer to use the existing authentication infrastructure to access resources protected by location-based access control. It allows different organizations to use their own infrastructure as the "front end" function of a shared location-based access control system, without having to share information with the other organization.

As described in FIG. 18, the organizations builds a database 76 which stores the namespace keys used by the system protected by the location-based access control, along with that organizations users 72 and groups 74. A program that interfaces with this database and the existing authentication system runs on the organization's network.

If the user 22 wishes to insert or request data 50, it does this using the aforementioned program. The user identifies using whatever authentication infrastructure is used by the organization (e.g. "smart-cards"). The user tells the program she wishes to access to a specific resource. The program ascertains whether the user is qualified for this operation. If the user is allowed to carry out the operation, the program finds the namespace used for this resource in it's database, and does the operation on behalf of the user using the namespace key for the location-based access control 16. If the user is not allowed then the operation is not carried out.

That is, all communication with the location based access control-protected database is done by a program that keeps a database of all the namespaces, and the permissions different users or groups have. When a user/requestor/inserter desires that operation be completed and something effected in the database, the system instructs the program to do it, and the program checks if the user has permission to do so and if so, does it for him/her using the appropriate namespace keys.

By contrast to prior art systems the instant system solves several longstanding problems: (1) since access by user(s) is one way, the user never gains access to the server's full data base (e.g. a VPN requires access to the server's file) and by depositing the files on the desk top of the user the likelihood of being able to work backwards is low—in other words—an updated version as a snapshot is shuttled one way back and forth; (2) each node possesses a copy of the updated snapshot so that failure of any node does not elicit a failure of the system and the catastrophic loss of data; (3) no user knows the identifier of any other user; and (4) the system functions with multiple operating systems.

Moreover, not only is the system asynchronous but also does not require that the user does anything other than designate a file as the shared file and as long as it is stored in the designated folder it will be transmitted for sharing to the specified group automatically. In this way it differs from all systems which require either an attached/appended file or user intervention—obviously it prevents the inadvertent sending of material to non-parties or sensitive data to the wrong recipient.

These and other objects, advantages, features and aspects of the present invention will become apparent as the following description proceeds. While the foregoing embodiments of the invention have been set forth in considerable detail for the purposes of making a complete disclosure of the invention, it will be apparent to those of skill in the art that numerous changes may be made in such details without departing from the spirit and the principles of the invention.

We claim:

1. A method for inserting data into a database comprising the steps of:

a. installing the system on a node;

b. creating an export folder and scheduling a backup;

c. generating a namespace and encryption key;

d. creating an authentication proxy adapted to retain and store keys;

e. operating system in communication with said node where system has been installed;

f. creating data to be inserted;

g. attempting to insert data from the export folder to the database node;

h. checking for the existence of the data in the local cache;

i. determining whether data exists, so that if data exists the operation terminates, if data does not exist the data is sent to the authentication server and authenticated therein;

j. determining whether authenticated and if namespace exists;

k. determining if namespace exists and the user is authorized, the program determines whether the data has been previously cached by the proxy server, if it has been cached the program will fail, if it hasn't been cached, the program will connect to the database;

l. upon connecting, the program will insert the data in the database; and m. the database checks if this entry exists in the database, if it does there is failure, if it doesn't exist, the entry succeeds, if the entry succeeds, the proxy caches the data and the program caches the data.

2. A database as recited in claim 1, further comprising a series of key value entries.

3. A method as recited in claim 1, wherein data once requested by said user from said database is cached locally and once cached said data is available locally without validation.

* * * * *